United States Patent [19]

Beuscher et al.

[11] Patent Number: 4,484,323

[45] Date of Patent: Nov. 20, 1984

[54] COMMUNICATION ARRANGEMENTS FOR DISTRIBUTED CONTROL SYSTEMS

[75] Inventors: Hugo J. Beuscher, Glen Ellyn; Harry L. Bosco, Naperville; Allen H. Huizinga, Wheaton; John R. Williams, Naperville, all of Ill.

[73] Assignee: AT&T Bell Laboratories, Murray Hill, N.J.

[21] Appl. No.: 388,276

[22] Filed: Jun. 14, 1982

[51] Int. Cl.³ .......................................... H04Q 11/04
[52] U.S. Cl. .................................................... 370/58
[58] Field of Search ....................... 370/58, 65, 66, 68, 370/59, 64, 63, 110.1

[56] References Cited

U.S. PATENT DOCUMENTS

| | | | |
|---|---|---|---|
| 3,623,011 | 6/1969 | Baynard et al. | 340/172.5 |
| 3,912,873 | 10/1975 | Skaperada | 370/63 |
| 4,074,072 | 2/1978 | Christensen et al. | 370/65 |
| 4,178,479 | 12/1979 | McDonald et al. | 370/59 |
| 4,213,201 | 7/1980 | Gagnier et al. | 370/66 |
| 4,228,535 | 10/1980 | Workman et al. | 370/63 |
| 4,254,498 | 3/1981 | Tarawa et al. | 370/63 |
| 4,280,217 | 7/1981 | Hafer et al. | 370/63 |
| 4,322,843 | 3/1982 | Beuscher et al. | 370/63 |
| 4,377,859 | 3/1983 | Dunning et al. | 370/68 |
| 4,382,294 | 5/1983 | Beuscher et al. | 370/63 |

OTHER PUBLICATIONS

R. Scheller et al., "A Local PCM Switching System for Voice and Data", ISS Conference, May 1979, pp. 419–426.

H. Takeda et al., "Time Division Switching Control System", Review of the Elec. Comm. Labs., Sep.–Oct. 1979, vol. 27, No. 9-10, pp. 773–782.

Primary Examiner—Douglas W. Olms
Attorney, Agent, or Firm—K. H. Samples

[57] ABSTRACT

A time division switching system having distributed control processors is disclosed. The distributed processors exchange control messages and cooperate in the completion of talking paths between subscribers. Each control message includes an address portion defining the destination for the control message and is transmitted to a time-shared space division switch on the same time multiplex lines that speech representations are transmitted. Control messages are routed by the time-shared space division switch to a control distribution unit where the address portion is interpreted. When the address portion defines a distributed processor which controls the time-shared space division switch, the control distribution unit transmits the associated control message directly to that processor. Alternatively, when the address portion defines one of the other distributed processors the control distribution unit transmits the associated control message to the defined processor via the time-shared space division switch. Additionally, each control message can comprise an intervention portion and an arrangement is associated with each distributed processor which responds to the intervention portions by altering the functions performed by an associated distributed processor.

14 Claims, 12 Drawing Figures

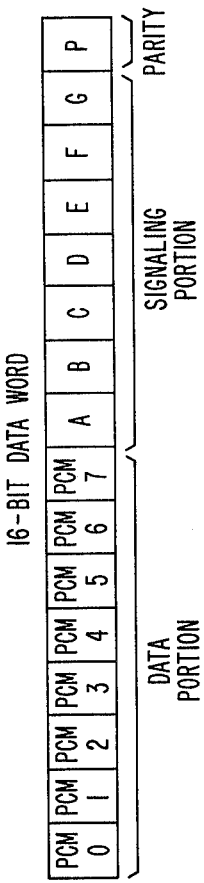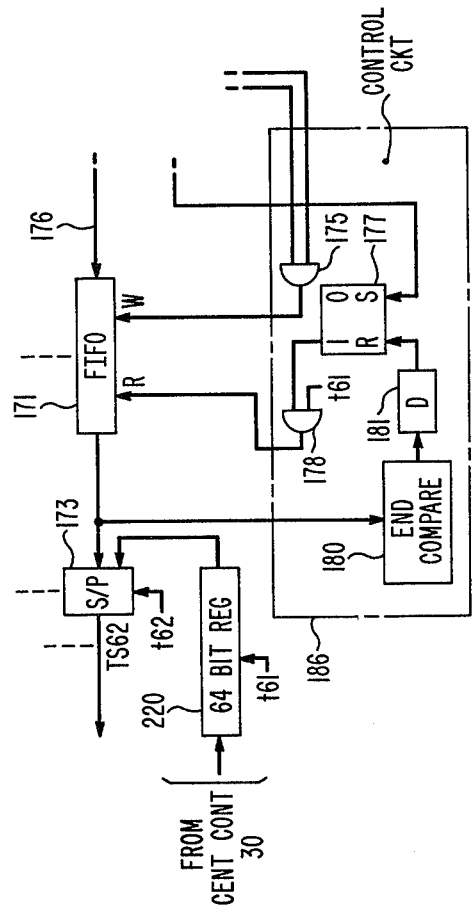

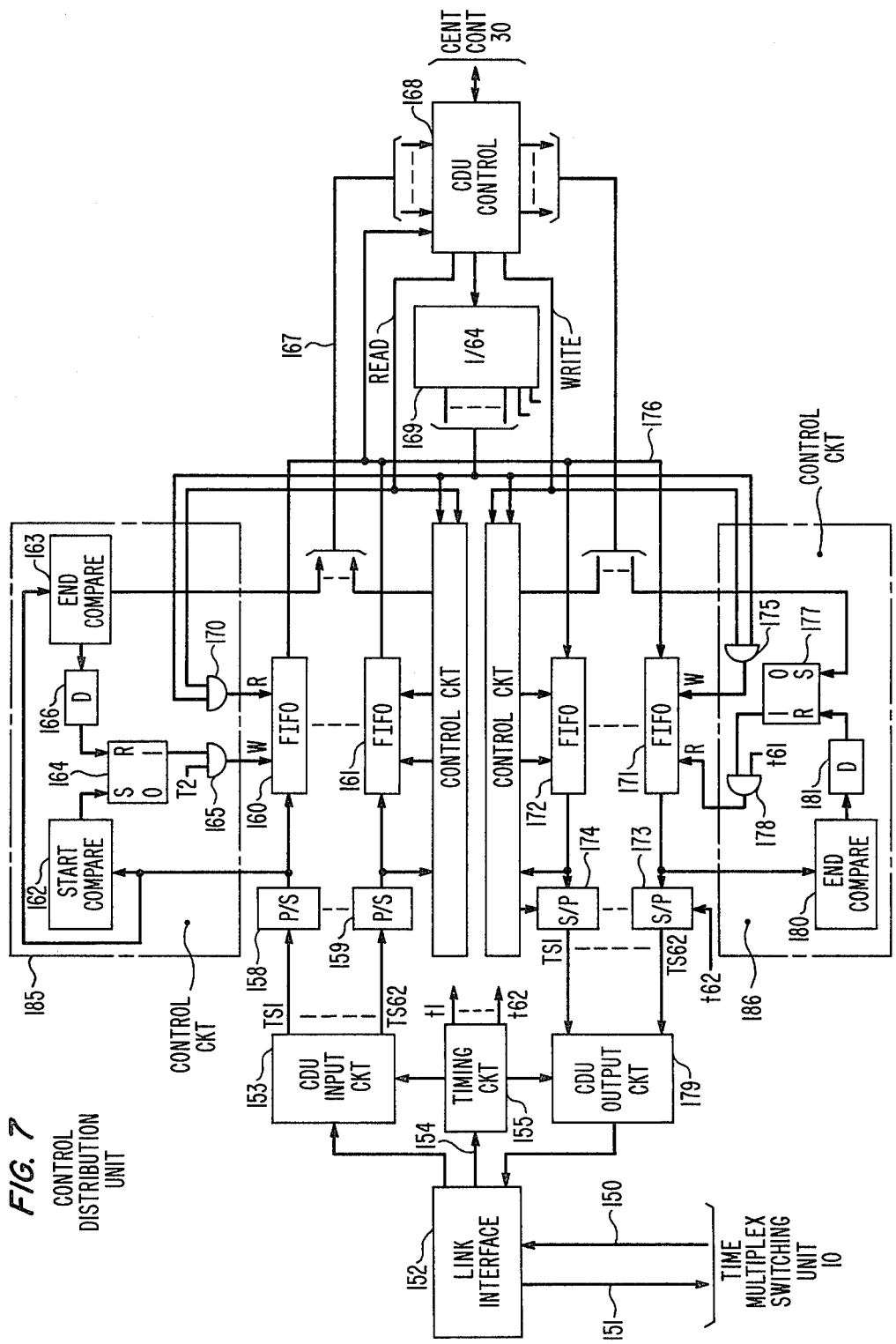

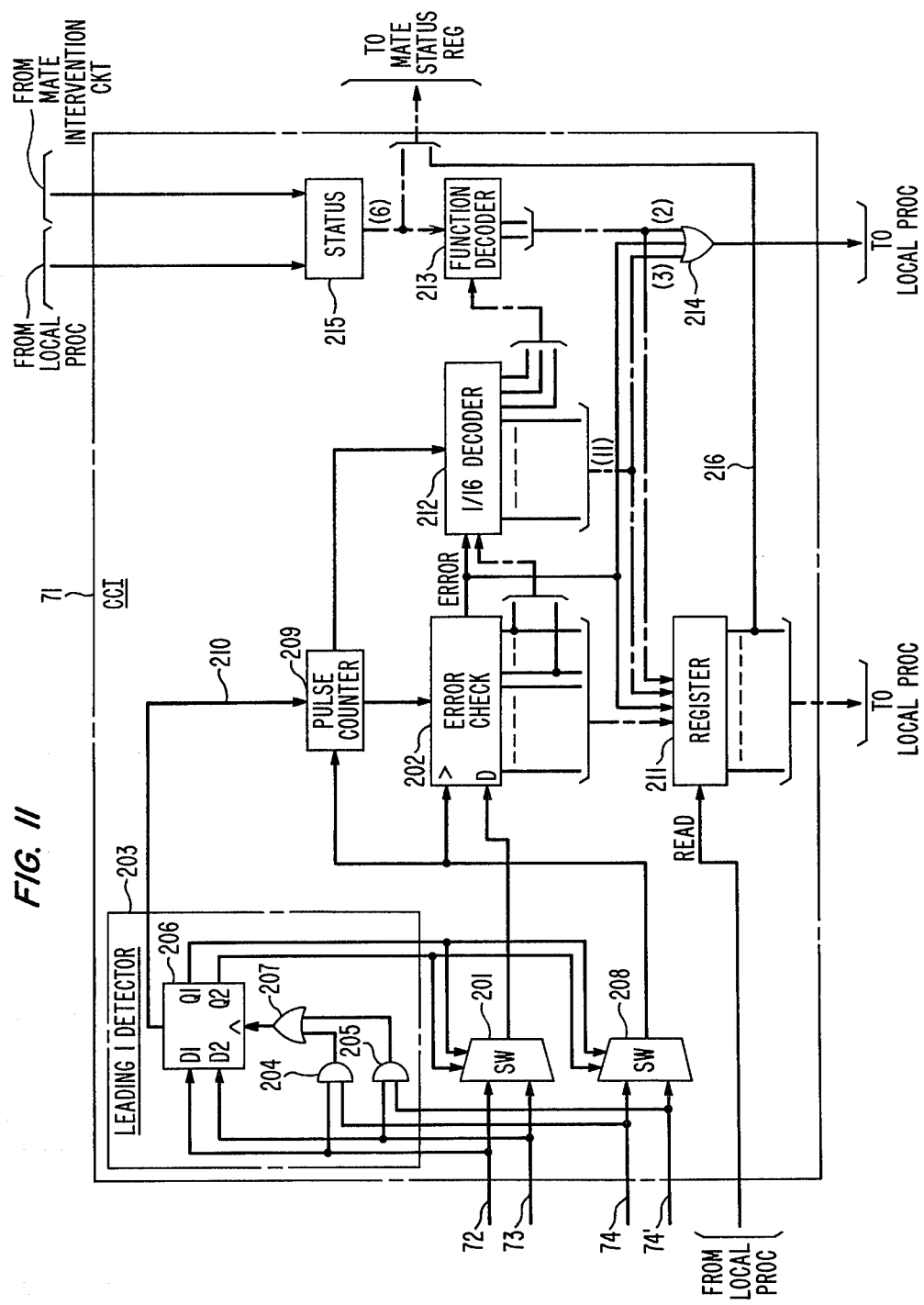

COMMUNICATION ARRANGEMENTS FOR DISTRIBUTED CONTROL SYSTEMS

TECHNICAL FIELD

This invention relates to time division switching systems, and more particularly, to fault recovery techniques for such systems.

BACKGROUND OF THE INVENTION

Stored program control communication switching systems comprise some form of intelligence which controls switching functions in response to a program stored in memory. Historically, such systems included a single processing entity for the control of the entire system. As technology and system design evolved, it was found desirable to separate certain routine functions from the main processing entity to save its processing time for more complex system functions and decisions. Today, systems are being designed which also separate some of the more complex system functions and decisions into several intelligent processors. Throughout the evolution of switching system control strategies, changes have occurred in the way the various processing entities intercommunicate. Some systems have provided a separate controller bus structure to be used for all communication among the processors. Other systems have utilized the normally speech conveying communication paths of the switching system to provide communication paths between the distributed system processors and a central controller which interprets control information and directs the overall operation of the switching system.

The tolerance of system faults is necessary in telephone switching systems in order to maintain system integrity. As the functions performed by the distributed processors of a telephone switching system have become more important to call completion, and the processors have become more autonomous in this operation the tolerance of faults associated with those distributed processors has become very difficult to achieve. In those cases where the only communication link between the central intelligence and the distributed processors is controlled at least in part by those distributed processors, remotely effectuating fault tolerance is extremely difficult.

The present invention is an arrangement for remotely controlling the distributed processors of a telecommunication system in which a central intelligence communicates with the distributed processors through a portion of the telephone switching network.

SUMMARY OF THE INVENTION

A time division switching system in accordance with the present invention comprises a plurality of communication units, each comprising a communication unit controller and an intervention controller, a control arrangement for transmitting control messages, each message comprising a plurality of control words, and a time-shared space division switch connected to the communication units and the control arrangement for selectively transmitting control words to the communication units. In accordance with the present invention, each of the communication units further comprises arrangements for receiving the control words, for transmitting a first portion of each control word to the control unit controller and for transmitting a second portion of the control words to an intervention controller, and the intervention controller comprises an arrangement responsive to the second portions of the control words for altering the functions performed by the control unit controller.

BRIEF DESCRIPTION OF THE DRAWING

A more complete understanding of the present invention may be obtained from a consideration of the following description when read in conjunction with the drawing in which:

FIG. 6 is a diagram of the data words utilized in the embodiment of FIG. 1;

FIG. 7 is a more detailed diagram of the control distribution unit of the embodiment shown in FIG. 1;

FIG. 11 is a diagram of a central control intervention arrangement utilized in the present invention; and FIG. 12 is an alternative embodiment of a portion of the control distribution unit shown in FIG. 7.

GENERAL DESCRIPTION

Figure 1:
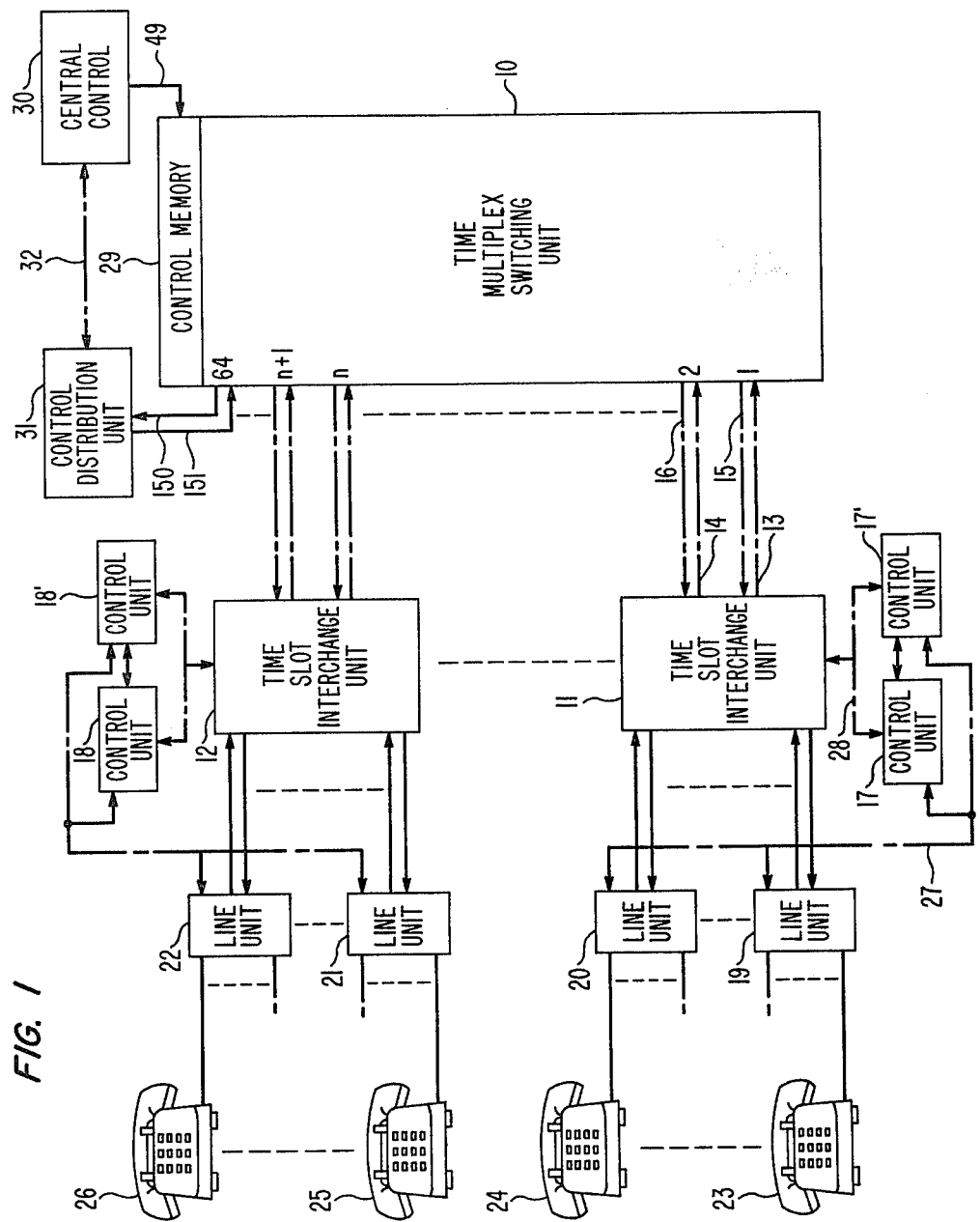
FIG. 1 is a block diagram of a system embodying the present invention.

FIG. 1 is a block diagram of a time division switching system embodying the present invention which is used to interconnect subscriber sets such as subscriber sets 23 through 26. The embodiment of FIG. 1 includes a time multiplex switching unit 10 which comprises a time-shared space division switch having 64 input ports and 64 output ports. The embodiment further includes 31 time-slot interchange units of which representative time-slot interchange units 11 and 12 are specifically shown. Each time-slot interchange unit 11 and 12 includes a bidirectional time-slot interchanger. Additionally, each time-slot interchange unit 11 and 12 is connected to two input ports and two output ports of time multiplex switch unit 10. In the present embodiment, time-slot interchange unit 11 is connected to two time multiplex switch input ports via time multiplex lines 13 and 14 and to two output ports, via time multiplex lines 15 and 16.

In the description which follows, the input and output ports of time multiplex switching unit 10 are referred to as input/output port pairs. This term is used since the source for data words to an input port of a given input/output port pair is also the destination for data words from the output port of that pair. As shown in FIG. 1, input/output port pair 1 is associated with time multiplex lines 13 and 15. Each time multiplex line 13 through 16 conveys digital information in 125 microsecond frames each comprising 256 time separated channels. Accordingly, each time-slot interchange unit transmits and receives up to 512 channels of digital information during each 125 microsecond frame.

Each time-slot interchange unit is uniquely associated with a pair of control units of which control units 17 and 17' are associated with time-slot interchange unit 11, and control units 18 and 18' are associated with time-slot interchange unit 12. During normal operation, only one of the control units of a given pair of control units, e.g., 17, 17' is active at any given time. The other control unit is kept in a standby mode to replace the active control unit if trouble occurs. Additionally, each time-slot interchange unit is connected to a plurality of line units of which line units 19 through 22 are shown in FIG. 1 via individual time multiplex lines. In the present embodiment, line units 19 and 20 are connected to time-slot interchange unit 11 and line units 21 and 22 are connected to time-slot interchange unit 12. Each of the line units of the present embodiment is connected to a number of subscriber sets of which subscriber sets 23 through 26 are shown. The exact number of line units associated with each time-slot interchange unit and the exact number of subscriber sets associated with each line unit is determined by the number of subscribers to be served and the calling rates of those subscribers. Each line unit terminates the analog loop of the well-known type from a plurality of subscriber sets, e.g., 23 through 26, and converts call information including analog speech signals into digital data words which are transmitted to its associated time-slot interchange unit. Further, each line unit detects service requests from the subscriber sets and generates certain signaling information for those subscriber sets. The particular subscriber sets from which speech samples are taken and encoded, and the particular time multiplex channels used to transmit the resulting code between the line unit and its associated time-slot interchange unit are determined by the active control unit of the associated time-slot interchange unit.

The relationship of subscriber sets, line units and time-slot interchange units is substantially the same for each of such groups of interconnected units. Accordingly, while the description which follows relates directly to subscriber set 23, line unit 19 and time-slot interchange unit 11, it shows the relationships for all other groups of such units. For the present description it is assumed that control units 17 and 18 are active and control units 17' and 18' are standby. Line unit 19 scans the lines connected to each subscriber set to detect requests for service. When such a request is detected, line unit 19 transmits to the control unit 17, a message indicating the request and the identity of the requesting subscriber set. This message is transmitted to control unit 17 via a communication path 27. Control unit 17 performs the necessary translation based on the service requested, the identity of the requesting subscriber set and the available equipment, and transmits a message to line unit 19 via communication path 27 defining which of the plurality of time separated channels between line unit 19 and time-slot interchange unit 11 is to be used to transmit information from subscriber set 23 to time-slot interchange unit 11. Based on this message, line unit 19 encodes the analog information from subscriber set 23 into digital data words and transmits the resulting data words in the assigned channels. In the present embodiment, line unit 19 also transmits in the assigned channel an indication of the DC state, i.e., open circuit, closed circuit, of the subscriber loop associated with subscriber set 23.

After a time separated channel between line unit 19 and time-slot interchange unit 11 is assigned to a given subscriber set, active control unit 17 detects signaling information from the subscriber set by sampling the information transmitted in the assigned channel. Such sampling operations are performed via a communication path 28. Control unit 17 responds to the signaling information from the subscriber's channel, and to control messages from other control units, e.g., 18, and a central control unit 30, by controlling the time-slot interchange function of the time-slot interchange unit 11. As previously stated, each time multiplex line between a time-slot interchange unit and the time multiplex switch unit 10 has 256 channels each 125 microsecond frame. These channels are assigned numerical designations from 1 to 256 in sequence as they occur. This sequence of channels recurs so that a given channel will be available every 125 microseconds. The time-slot interchange function takes the data words received from the line units and places them in channels on the time multiplex line between the time-slot interchange units and the time multiplex switching unit 10 under the control of control units 17 and 18.

Time multiplex switching unit 10 operates in recurring frames of time slots where each 125 microsecond frame comprises 256 time slots. During each time slot, time multiplex switching unit 10 is capable of connecting data words received at any of its 64 input ports to any of its 64 output ports in accordance with time-slot control information stored in a control memory 29. The configuration pattern of connections through time multiplex switching unit 10 repeats itself every 256 time slots and each time slot is assigned a numerical designation in sequence from 1 to 256. Accordingly, during a first time slot TS 1 the information in a channel (1) on time multiplex line 13 may be switched by time multiplex switching unit 10 to an output port 64 while during the next time slot TS 2 the next channel (2) on time multiplex line 13 may be switched to an output port n. Time-slot control information is written into control memory 29 by the central control 30 which derives this control information from control messages obtained from various control units, e.g., 17 and 18.

Central control 30 and the active control units 17 and 18 exchange control messages utilizing selected channels called control channels of the time multiplex lines, e.g., 13 through 16, between the time-slot interchange units and the time multiplex switching unit 10. In the present embodiment, each control message comprises a plurality of control words and each control channel can transmit one control word per frame of 256 time separated channels. The same channel of the two time multiplex lines associated with a given input/output port pair is predefined to be a control channel. Additionally, a given channel is used as a control channel for only one pair of time multiplex lines. For example, if channel 1 is used as a control channel on time multiplex line 13 and the associated time multiplex line 15, no other time multiplex line will use channel 1 as a control channel. During each time slot having the same numerical designation as a control channel, time multiplex switching unit 10 connects the data word occupying that control channel to the 64th output port and connects the 64th input port to the output port associated with the above-mentioned control channel. The following is an example of the operation of the present embodiment when channel 1 is the control channel for time multiplex lines 13 and 15, and channel 2 is the control channel for time multiplex lines 14 and 16. During time slot TS 1 information from control memory 29 defines, among other connections, that the control word in channel 1 of time multiplex line 13 is connected to output port 64 and that the control word in channel 1 at input port 64 is connected to time multiplex line 15. Similarly, during time slot number TS 2, information from control memory 29 defines that the control word in channel 2 of time multiplex line 14 is connected to the output port 64 and that the control word in channel 2 at the input port 64 is connected to time multiplex line 16. When operating in this manner, output port 64 receives from time multiplex switching unit 10 all control words in a channel having the same numerical designation in which they were transmitted to the time multiplex switch. Further, each control channel is connected to receive control words from input port 64 during the time slot having the same numerical designation as their associated control channel. Control words switched to the 64th output port are transmitted to a control distribution unit 31 which temporarily stores them in a location associated with that control channel. The association of control channels with storage locations in control distribution unit 31 identifies the source of the information stored.

Each control message from a time-slot interchange unit comprises a start character, a destination portion, a signaling information portion, and an end character. The destination portion uniquely defines the expected destination of the control message. Control distribution unit 31 interprets the destination portion of each control message to determine the proper destination for the control message and retransmits the message to input port 64 of time multiplex switching unit 10 in a channel having the same numerical designation as the control channel associated with the destination unit.

When operating as above described, the time-slot interchange unit 11 transmits control messages to time-slot interchange unit 12 by transmitting control words during its recurring control channel to form a control message having a destination portion identifying time-slot interchange unit 12. Control distribution unit 31 accumulates the control words, interprets the destination portion, and retransmits the message to the input port 64 during the channel having the same numerical designation as the control channel associated with time-slot interchange unit 12. A control message can also be transmitted to the central control 30 by defining central control 30 in the destination portion of the control message. When this occurs, control distribution unit 31 transmits the message to central control 30 via a communication link 32 rather than returning it to the time multiplex switching unit 10. Similarly, a message may be transmitted from central control 30 to one of the time-slot interchange units by transmitting to the control distribution unit 31 a control message having a destination portion defining the particular time-slot interchange unit. This transmission is also accomplished utilizing communication link 32.

Each of the control units, e.g., 17 and 18, includes a memory 57 (FIG. 3) which stores the program for the control of its associated control unit and data regarding the primary function of the control unit, its associated time-slot interchange unit and its associated subscribers. Memory 57 stores such information as class of service, the subscriber limits for gain or attenuation, toll screening information, and information relating to changes in normal call handling procedures, e.g., terminating party hold or joint hold. Much of the contents of the given memory 57 is not stored in memory locations associated with any other control unit or the central control. It may, however, be stored in a bulk memory (not shown) for maintenance purposes. Some of the information in memory 57 e.g., terminating party or joint hold information, relates primarily to functions performed by other control units. This information is stored in association with the subscriber to which it relates to avoid data replication and to avoid the inefficiencies of centralized storage of such information. The previously described arrangement utilizing control channels transmitted through the control distribution unit 31 is utilized to send this call related information to other control units and the central control.

Duplicated control units, e.g., 17 and 17', are provided primarily so that a backup (standby) control unit will be available in case the primary or active control unit ceases to function properly. Each pair of control units is interconnected and a number of well-known arrangements are utilized to remove an improperly functioning control unit and replace it with the previously standby control unit. For example, maintenance and recovery programs, operating in conjunction with the active control unit 17 may detect a greater number of errors occurring in that control unit than are to be permitted. In this case, the maintenance and recovery programs reset an activity flip-flop (not shown) in the active control unit 17 defining it to be standby, and set the activity flip-flop (not shown) of the standby control unit 17' defining it to be active. The switching system can then continue to process calls under the control of the new active control unit 17' and further maintenance can be performed on the new standby control unit 17. Detailed information relating to maintenance and diagnostic functions for duplicated control units is provided in the Bell System Technical Journal, Vol. 43, pp. 1831-2191, September, 1964.

It is possible that a control unit pair, e.g., 17 and 17', would not be able to detect internal faults and/or implement a change of status. For example, if the active processor through error began executing an infinite loop, it would not process calls correctly, and might not be able to execute the normal active stand-by status change either. Accordingly, the stand-by processor although capable of accurate control would not be placed in control of the switching system. Further, the faulty control unit might not be able to respond to control messages from the central control 30. It has been found desirable to provide an arrangement external to each control unit which can control certain control unit functions so that central control 30 can exercise control when a given control unit cannot directly respond to control messages. Accordingly, each control unit 17, 17', 18, and 18', comprises a central control intervention arrangement 71 (FIG. 3) by means described later herein each central control intervention arrangement 71 receives commands from central control 30 directing various actions to be performed with regard to the control unit associated with the central control intervention arrangement receiving the command. Commands are transmitted via the control distribution unit 31 and the time multiplex switch 10 as are control messages. The reception of such commands by the central control intervention arrangement 71, however, is not controlled by the processing entity of the control unit.

Detailed Description

Line Unit 19

Figure 2:
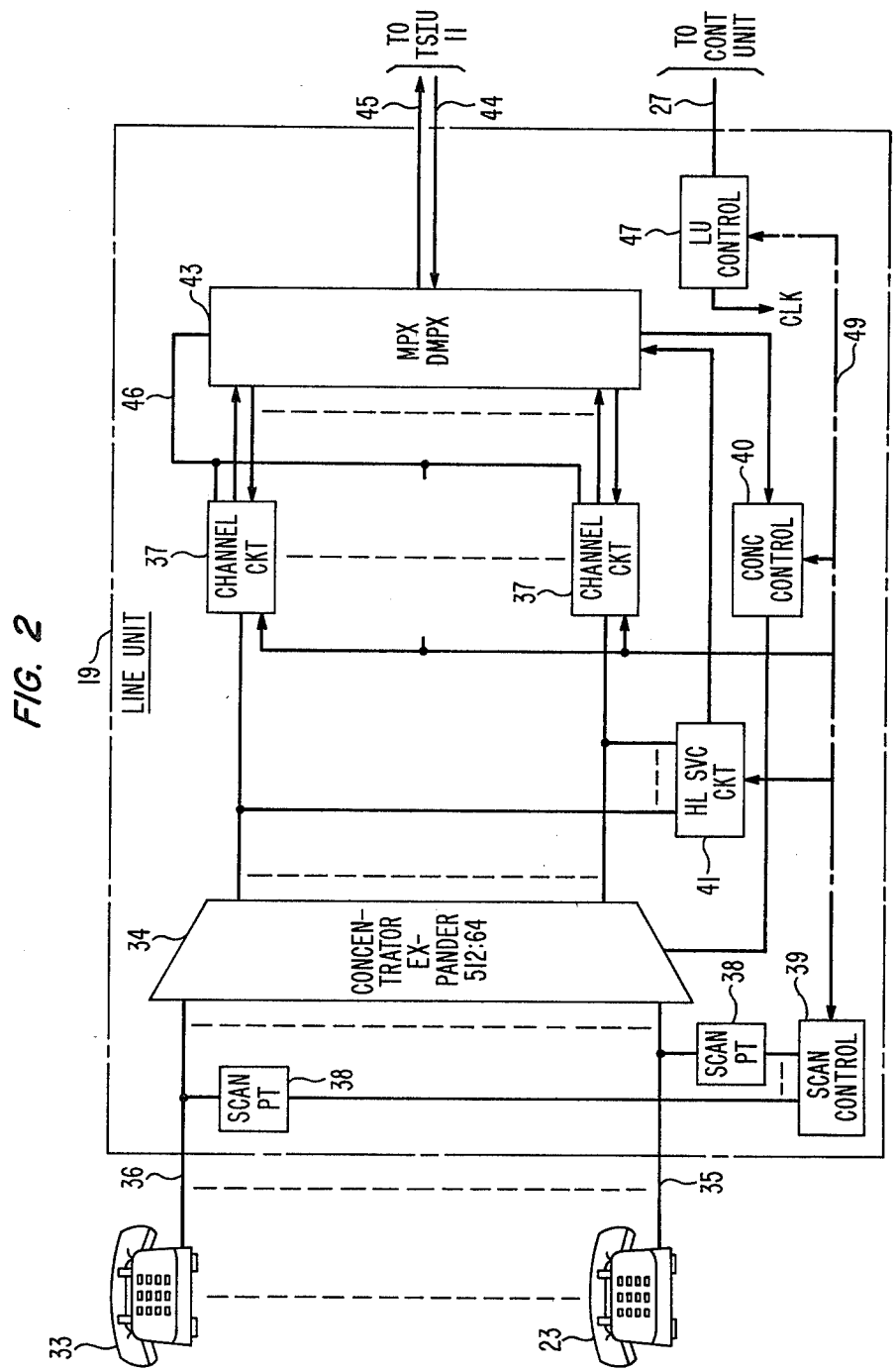
FIG. 2 is a more detailed diagram of a line unit utilized in the embodiment of FIG. 1.

Line unit 19 is shown in greater detail in FIG. 2. It should be noted that all of the line units of the present embodiment are substantially identical to line unit 19. Up to 512 subscriber sets, such as subscriber sets 23 and 33, can be connected to each line unit of the present embodiment. These subscriber sets are connected to a concentrator/expandor 34 via subscriber loop circuits of a type well known in the art. Subscriber set 23 is connected to concentrator/expandor 34 via subscriber loop circuit 35 and subscriber set 33 is connected to concentrator/expandor 34 via subscriber loop circuit 36. Concentrator/expandor 34 has 512 input terminals and 64 output terminals thus providing 8 to 1 concentration and expansion. The present embodiment also includes 64 channel circuits 37 which convert analog information from the subscriber sets into digital data words before transmission to the switching system, and which convert digital information from the switching system back to analog form for transmission to the subscriber sets. Each of the channel circuits 38 is connected to one of the output terminals of concentrator/expandor 34. Each of the output ports of concentrator/expandor 34 is also connected to a high-level service circuit 41 which is used, for example, to provide ringing current to the subscriber sets. Each of the channel circuits 37 samples the analog signals from its associated output terminal of concentrator/expandor 34 at an 8-kilohertz rate and converts those samples to 8-bit PCM representations of the analog samples. This 8-bit PCM representation is used as a part of the data word transmitted to the time-slot interchange unit 11. Each data word as shown in FIG. 6 is 16 bits in length and comprises an 8-bit PCM data portion, a 7-bit signaling portion, and a parity bit. The signaling portion is used to convey signaling information about the channel circuit or the subscriber set to which it is connected. For example, the A-bit of the signaling portion is used to transmit the present DC state of the associated subscriber set to the time-slot interchange unit 11.

The data words are transmitted from the channel circuit 37 to a multiplex/demultiplex circuit 43 which is connected to transmit and receive time multiplex digital information to and from time-slot interchange unit 11. Multiplex/demultiplex circuit 43 transmits digital information to time-slot interchange unit 11 on time multiplex line 45 in 125 microsecond frames each comprising 64 channels of 16 bits each. Each channel transmitted on time multiplex line 45 is uniquely associated with one of the channel circuits 37 and is used to convey information from that channel circuit to the time-slot interchange unit 11. Multiplex/demultiplex circuit 43 operates in the manner well known in the art to transmit the 16-bit data words from each of the channel circuits 37. Multiplex/demultiplex circuit 43 receives digital information from the time-slot interchange unit 11 via a time multiplex line 44 in a format substantially identical to the format on time multiplex line 45. When operating as a demultiplexor, multiplex/demultiplex circuit 43 transmits the data word received in each channel on time multiplex line 44 to the one of channel circuits 37 uniquely associated with that channel. The particular channel circuit 37 which is to receive the channel is determined by the position of that channel within a frame of such channels. The channel circuit 37 then decodes the 8-bit PCM data word and transmits the resulting analog signal to its associated subscriber via the concentrator/expandor 34. Multiplex/demultiplex circuit 43 also includes a clock regeneration circuit (not shown) which generates clock signals from the signals on time multiplex line 44 in a manner well known in the art. These clock signals are used to control timing in the multiplex/demultiplex circuit 42 and transmitted via a conductor 46 to the channel circuits 37 to control the timing thereof.

As previously stated, active control unit 17 controls many of the operations performed by each of the line units. The main processing entity of control unit 17 is a processor 66 (FIG. 3) which operates in response to instructions stored in a memory 57. Control unit 17 also includes a control interface circuit 56 which receives instructions from the processor 66 via a bus 59 and in response thereto, communicates with the line units, e.g., 19 and 20 via the control bus 27. Control bus 27 comprises a plurality of communication paths at least one of which is uniquely associated with each line unit. Each line unit includes a line unit controller which is connected to the control bus 27. In the present embodiment, line unit 19 includes a line unit controller 47 (FIG. 2). Most communication between control unit 17 and line unit controller 47 is initiated by read or write orders from control unit 17. A read order is a direction to read some identifiable information in line unit 19 and comprises a single bit read indication and the address of the particular information to be read. A write order is a direction to write information into some unit in line unit 19 and comprises a write address, the information to be written, and a 1-bit write code. The particular unit to be written into or read from may be the scan controller 39, the concentrator controller 40 or the high-level service circuit 41. Line unit controller 47 partially decodes each order from control unit 17 and directs the remainder of the order and the read/write indicator bit to the particular unit addressed. The particular unit addressed responds to the address portion transmitted from control unit 17 and the read/write bit by reading or writing the storage location identified by the address portion. The information read from a particular unit in line unit 19 is returned to line unit controller 47 and transmitted thereby to control unit 17.

Each subscriber loop, e.g., 35 and 36, includes a scan point 38 which indicates the DC conduction state of its associated subscriber loop. Control unit 17 periodically scans the subscriber loops associated with the subscriber sets of the switching system by transmitting to the line units of FIG. 1 read orders defining a number of scan points to be read. In the present embodiment, such a scan order is received by line unit controller 47 which transmits the address and read/write bit portions of the order to scan control unit 39. The scan control unit 39 formulates a reply for the control unit 17 which consists of the present DC conduction state of the subscriber loops indicated by ones of scan points 38 identified in the address portion. Control unit 17 checks the information transmitted from scan control unit 39 to determine if any of the subscriber sets have changed state. If, for example, one of the subscriber sets has gone off-hook since the last scan, it is necessary to provide a communication path from that subscriber set through concentrator/expandor 34 to an available one of channel circuits 37. Accordingly, control unit 17 transmits a write order to concentrator control circuit 40 which responds thereto by connecting a subscriber set, e.g., subscriber set 33, to a predefined output terminal of concentrator-/expandor 34. No reply is required in response to a write order, however, it may be found that the return of an all-seems-well signal to control unit 17 will aid in maintaining the "sanity" of the overall system.

Time Slot Interchange Unit 11

As previously stated, the output signals of multiplex-/demultiplex circuit 43 consist of recurring frames each comprising 64 digital channels of 16 bits each. This information is transmitted to a multiplex unit 60 (FIG. 3) within time-slot interchange unit 11. Multiplex circuit 60 receives the output signals from eight line units which signals are reformatted and transmitted on an output time multiplex line 62 having 512 channels for each 125 microsecond frame. Similarly, a demultiplex circuit 61 receives 512 channels of 16-bits each on a time multiplex line 63 which channels are distributed in a predetermined arrangement to eight line units such as line unit 19. Further, multiplex unit 60 converts incoming channels of information from serial to parallel form and demultiplexor 61 converts the information it receives from parallel to serial form. The information transmitted in a given channel on time multiplex line 62 is stored in a receive time-slot interchanger 50 in a memory location uniquely associated with that given channel.

The particular memory location into which a given data word is stored is defined by time-slot designation signals generated by time-slot counter 54. Time-slot counter 54 generates a recurring sequence of 512 time-slot designations at the rate of one time-slot designation per time slot. The particular time-slot designation generated during the time slot in which a given data word is received defines the memory location within receive time-slot interchange 50 which is to store that data word. Data words are also read from receive time-slot interchange 50 at the rate of one data word per time slot. The memory address of the data word to be read from receive time-slot interchange 50 during a given time slot is obtained by reading control RAM 55. Control RAM 55 is read once per time slot at an address defined by the time-slot designation from time-slot counter 54 and the quantity so read is transmitted to receive time-slot interchange 50 as the read address for that time slot. Data words read from receive time-slot interchange 50 are transmitted to the time multiplex switch via a time multiplex line 68 and an interface unit 69. Data words from time multiplex switch unit 10 are received by time-slot interchange unit 11 via the interface unit 69 and are applied to time multiplex line 70. Time multiplex line 70 is connected to transmit time-slot interchange 53 which stores the incoming data words in a location defined by an address from control RAM 55. Data words are read from transmit time-slot interchange 53 at the address defined by the time-slot counter 54. Data words so read are transmitted on time multiplex line 63 for transmission to the line unit 19. It should be noted that control RAM 55 may be implemented as a number of control memories each associated with a particular circuit, e.g., transmit time-slot interchange 53. The particular configuration of control memories is not important to the present invention and may vary depending on timing and circuitry requirements within the time-slot interchange unit 11. The general principles of time-slot interchange as performed by the receive time-slot interchange 50, the control RAM 55, the time-slot counter 54 and the transmit time-slot interchange 53 are well known in the art and are not described in greater detail herein. One arrangement for reading and writing data words in time-slot memories is described in detail in U.S. Pat. No. 4,035,584, J. W. Lurtz.

Figure 3:
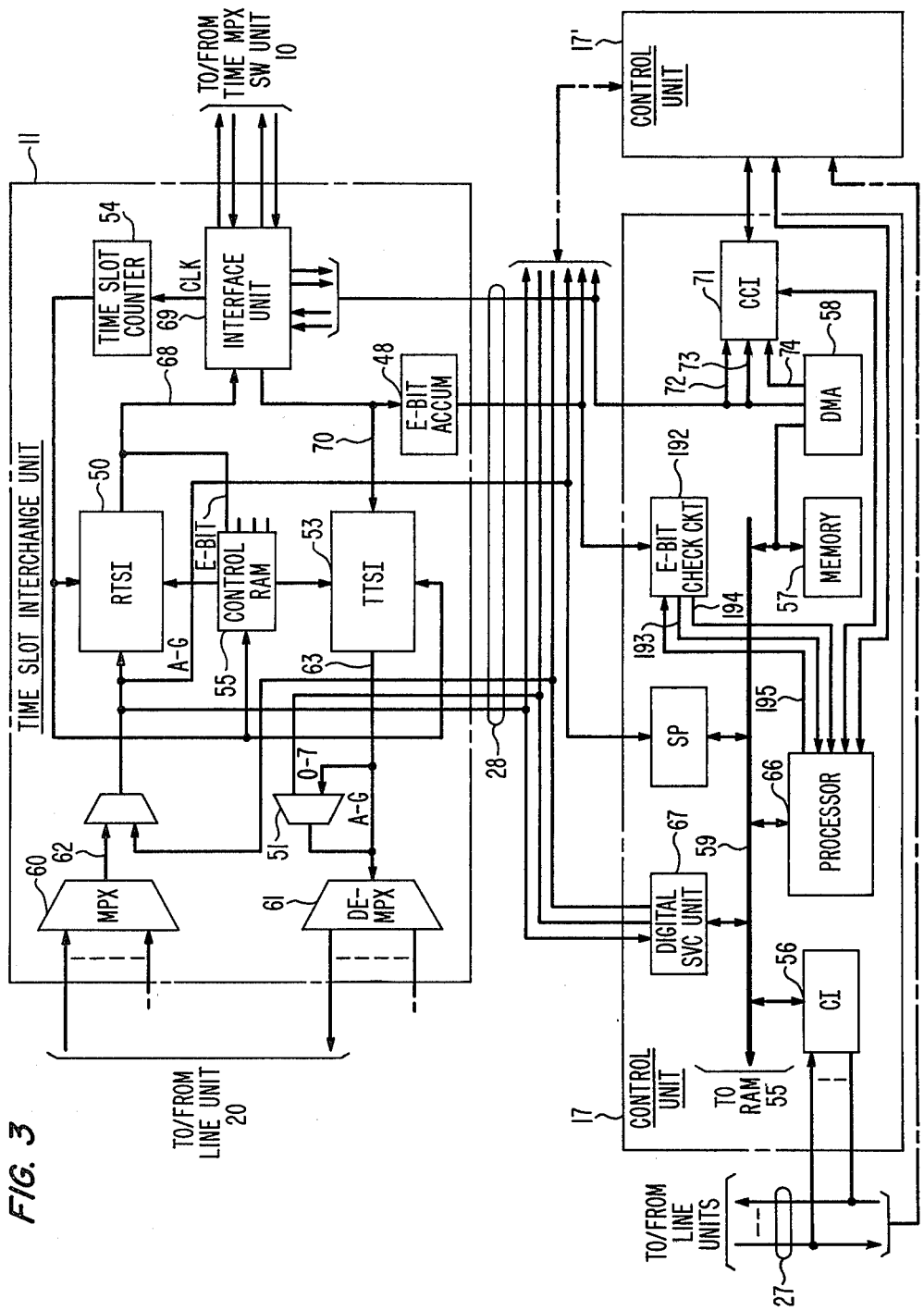
FIG. 3 is a more detailed diagram of the time-slot interchange unit and associated control unit utilized in the embodiment of FIG. 1.

Each data word on time multiplex line 62 is stored in time-slot interchange 50 as above described. In addition to storage in time-slot interchange 50 the signaling portion (bits A through G) of each data word received by the time-slot interchange unit 11 is transmitted to a signal processor 65 which is a part of control unit 17 (FIG. 3). Signal processor 65 reduces the real time load requirement of processor 66 by receiving and analyzing bits A through G. For example, signal processor 65 analyzes the A-bit of each data word, which bit indicates the DC state of associated subscriber set, to determine if a subscriber set has gone on-hook or if a valid dial pulse has been sent. When an on-hook status or a dial pulse is detected, the signal processor 65 transmits to processor 66 a signal indicating the information obtained. Processor 66 accumulates the information from signal processor 65 and responds by exercising control over the switching system in a manner to be described in greater detail later herein.

The embodiment of FIG. 3 also includes a digital service unit 67 which receives the data portion (FIG. 6) of each data word transmitted on time multiplex line 62. Digital service unit 67 is used primarily to receive and analyze tone signals from the subscribers which have been converted by a channel circuit 37 into PCM signals and to transmit tones and signals in PCM format. Digital service unit 67 comprises a memory (not shown) which has at least 65 storage locations to receive data portions of data words from time multiplex line 62. The data portion of each data word read from time multiplex line 62 is written into a location of digital service unit 67 defined by an address read from control RAM 55. Only 64 channels can be actively transmitting information to be utilized by the digital service unit 67. The data words from all other channels are written into the 65th memory location of digital service unit 67 where they are ignored. Digital service unit 67 reads the data words so stored, determines what signals are being received and communicates the identity and nature of those signals to processor 66. Processor 66 determines what action should be taken in response to the received signals.

Digital service unit 67 also transmits tones to the subscriber sets via time multiplex line 63 in the channel associated with that subscriber set. These tones, in PCM form, are transmitted from digital service unit 67 to a first input port of a gating circuit 51 during the time slot associated with the receiving subscriber. The other input port of gating circuit 51 is connected to receive the data portion of each data word read from transmit time-slot interchane 53. A gate control bit is read from control RAM 55 and transmitted to gate circuit 51 during each time slot to define that either the data portion from transmit time-slot interchange 53 or the data portion from digital service circuit 67 is to be transmitted to demultiplexer 61. In the present embodiment a logical "1" gating bit defines the digital service unit 67 as the source of the data portion and a logical "0" defines transmit time-slot interchange 53 as the source.

In addition to transmitting PCM encoded tones to its associated line unit, each time-slot interchange unit can transmit such tones toward time multiplex switch unit 10. This ability exists since, as described in greater detail later herein, audible ring tone for an originating subscriber is generated in the time-slot interchange unit associated with the terminating subscriber. The incoming time multiplex line 62 is connected as one input to a gating circuit 52 which is the point of insertion for tones to be transmitted toward the time multiplex switch unit 10. The other input of gating circuit 52 is connected to an output terminal of the digital service unit 67. Gating circuit 52 and digital service unit 67 operate in the manner previously described with respect to gating circuit 51, to place tones in predefined ones of the time multiplex channels on time multiplex line 62.

The PCM encoded representations of a given tone to be transmitted toward time multiplex switch 10 are placed in the same channel of time multiplex line 62 and are, accordingly, stored in the same addressable location of receive time-slot interchanger 50. In order to apply these tones to a given channel on outgoing multiplex line 68, control RAM 55 is controlled by processor 66 to generate the read address of the tone storing addressable location during the time slot associated with that channel. For example, audible ring tones may be placed in channel 512 of time multiplex line 62 resulting in their storage in the 512th addressable location of receive time-slot interchange 50. Whenever time-slot interchange unit 11 is to transmit audible ring tone in a given channel, processor 66 places the address 512 in the time-slot location of control RAM 55 associated with that given channel. Accordingly, each occurrence of the given channel will receive a PCM representation of audible ringing. When audible ringing is to terminate, processor 66 changes the address stored by control RAM 55 at the time-slot location associated with the given channel.

The following is a description of the interaction of signal processor 65, processor 66, and digital service unit 67. It is assumed for this description that a subscriber utilizing tone dialing has gone off-hook, and has been assigned to a channel circuit in the manner previously described with regard to line unit 19. After a channel circuit has been assigned, supervision is transferred to the digital service unit 67 and signal processor 65. By reading the signaling portion of the data word in the assigned channel, the signal processor 65 monitors the DC state of the subscriber set and communicates any changes to the processor 66. Further, processor 66 via bus 59 writes a logical "1" into the gating bit position of control RAM 55 associated with gating circuit 51 in the time slot of the channel associated with the newly off-hook subscriber. This defines that the output signals from the digital service unit 67 are to be transmitted to demultiplexor 61 via gating circuit 51 during the time slot associated with the newly off-hook subscriber. Additionally, processor 66, via bus 59, instructs digital service unit 67 to read from its internal storage the PCM representation of dial tone during the time slot associated with the newly off-hook subscriber. Accordingly, the dial tone is transmitted to demultiplexor 61 in the channel associated with the newly off-hook subscriber. Processor 66 also instructs digital service unit 67 to accumulate the data portion of each channel on time multiplex line 62 which is associated with the newly off-hook subscriber. In this manner dialed digits will be detected by digital service unit 67. Information regarding dialed digits and DC status of the particular subscriber set is transmitted to the processor 66 which terminates the transmission of dial tone and continues to accumulate dialed digits.

Control Information Communication

Figure 9:
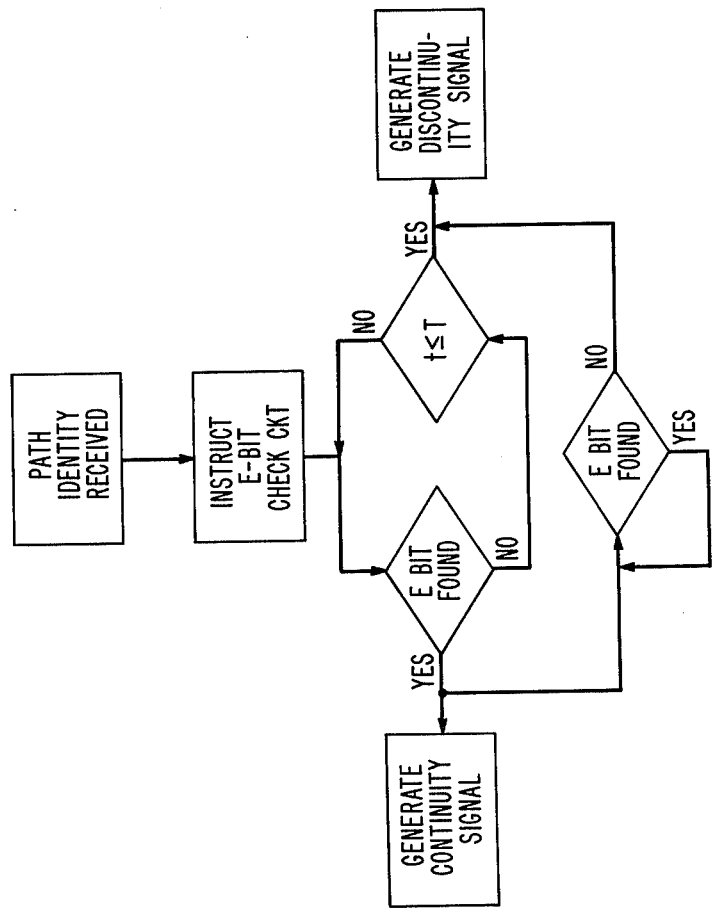
FIG. 9 is a flow diagram of the E-bit control sequence of the present embodiment.

The primary mode of control information exchange in the present embodiment comprises the transmission of control messages from a source time-slot interchange unit through the time multiplex switch 10 and the control distribution unit 31 and back to the destination time-slot interchange unit. A secondary mode of communication is also used whereby control information with regard to a given call is transmitted from the source time-slot interchange unit to the destination time-slot interchange unit via the time multiplex switch 10 utilizing the time slot assigned for that call. In the present embodiment, the E-bit position of the data word in the call time slot is used for the secondary mode communication. However, it can be seen that any or all of the signaling bits could be used in this secondary communication mode. In the present embodiment, the E-bit serves the dual purposes of communication path continuity check and signal acknowledgment. Control RAM 55 includes an E-bit position in each of its 512 storage locations. During the course of a call, processor 66 controls the digit stored in the E-bit position of each storage location of control RAM 55 associated with the call. As control RAM 55 transmits addresses defining data words to be read from receive time-slot interchange 50, it transmits the stored E-bit on time multiplex line 68 in place of the E-bit stored in receive time-slot interchange 50. This allows the transmission of messages utilizing the E-bit channel between time-slot interchange units. The arrangement in FIG. 3 also includes an E-bit accumulator 48 which receives the E-bit of each data word received on time multiplex line 70. These E-bits are transmitted to an E-bit check circuit 192 by E-bit accumulator 48. E-bit check circuit 192 responds to instructions from processor 66 on conductor 195 to transmit output signals relating to the E-bits of selected data words to processor 66. For example, during communication path establishment, processor 66 instructs E-bit check circuit 192 to survey the E-bit position of a particular channel and to notify processor 66 if a logical "1" is received within a predetermined period of time. FIG. 9 is a flow diagram of the function performed by E-bit check circuit 192. When no logical "1" E-bit is found in the specified channel within the predetermined period of time, a discontinuity signal indicating this fact is transmitted to processor 66 via conductor 193. Alternatively, when such a logical "1" is found by E-bit check circuit 192 within the time period, a continuity signal is transmitted to processor 66 via conductor 194. The E-bit check circuit 192 also surveys the E-bit of each active call. When the E-bit of an active call becomes a logical "0" and stays such for a fixed period of time, the above-mentioned discontinuity signal is transmitted to its associated processor 66. Any processor 66 receiving a discontinuity signal transmits a control message to central control 30 indicating this fact.

Figure 10:
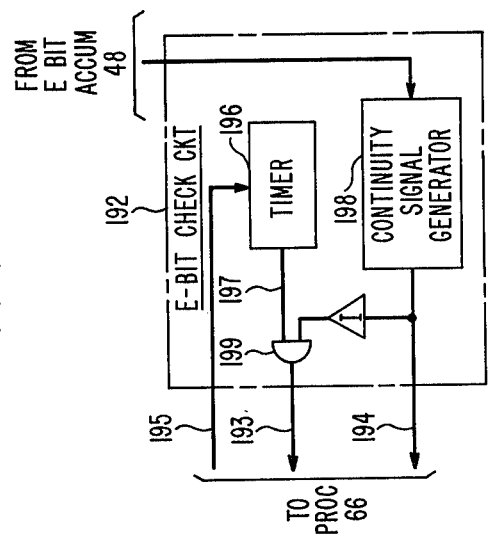
FIG. 10 is a diagram of an E-bit check circuit used in the present embodiment.

FIG. 10 shows the portion of E-bit check circuit 192 associated with one incoming channel, i.e., communication path. A timer 196 begins to count in response to an instruction from processor 66 on conductor 195. When the predetermined period of time has passed since the instruction was received from processor 66 timer 196 transmits a logical "1" on conductor 197 which is connected as one input of AND gate 199, the output of which is connected to conductor 193. Continuity signal generator 198 receives the E-bit position of the associated channel and generates a logical "1" output on conductor 194 in response to a logical "1" E-bit. The logical "1" on conductor 194 is continuously applied until a logical "0" E-bit is found by continuity signal generator 198. The output signals from continuity signal generator 198 are also inverted and applied to an input of AND gate 199. Accordingly, when timer 196 generates its logical "1" output, it will be applied as a discontinuity signal to conductor 193 via AND gate 199 when continuity signal generator 198 is via generating a logical "0" output, indicating that no E-bits have been received. Alternatively, whenever continuity signal generator 198 is generating a logical "1" output, the signal on conductor 193 is forced to a logical "0" while the logical "1" continuity signal is transmitted on conductor 194. It should be noted that the functions of the E-bit check circuit may be advantageously performed by processor 66, thus, making the separate E-bit check circuit 192 unnecessary. The use of the E-bit channel in implementing call completion is discussed in greater detail later herein.

The following is a description of the primary mode of communication between the various control entities of the switching system. Processor 66, in response to a complete dialed number, performs translations with regard to that dialed number and formulates a control message for central control 30 (FIG. 1) so that an idle time slot for the call can be established through time multiplex switch unit 10. This control message is stored in memory 57 by processor 66. A DMA unit 58 of a type well known in the art reads the control message at the rate of one control word per frame and transmits that word to a control word source register 80 (FIG. 4) in interface unit 69 for transmission on the time multiplex line to time multiplex switch 10. Similarly, control messages are received from other control units and the central control 30 at a control word destination register 92 (FIG. 4) in interface unit 69 and transmitted by DMA unit 58 to the memory 57 where they are read by processor 66. Interface unit 69, which is shown in detail in FIG. 4, includes a multiplex/demultiplex circuit 75 and two link interfaces 78 and 79. Multiplex/demultiplex circuit 75 is connected to receive data words from the receive time-slot interchange unit 50 via time multiplex line 68 and to transmit data words to transmit time-slot interchanger 53 via time multiplex line 70. It will be remembered that both time multiplex lines 68 and 70 convey data words at the rate of 512 channels per 125 microsecond frame. Multiplex/demultiplex circuit 75 splits the information received on time multiplex line 68 into two time multiplex lines 76 and 77 by transmitting the data words in each even-numbered channel on time multiplex line 77 and by transmitting each odd-numbered channel on time multiplex line 76. Each of the time muliplex lines 76 and 77 thus conveys information at the rate of 256 channels per frame. Additionally, multiplex/demultiplex circuit 75 combines the information on two 256 channel time multiplex lines 85 and 86 onto the 512 channel time multiplex line 70. This combination occurs by alternatingly transmitting the data words from time multiplex lines 85 and 86 such that the data words from time multiplex line 85 are transmitted in the odd-numbered channels of time multiplex line 70 while data words from time multiplex line 86 are transmitted in even-numbered channels. In the present embodiment, time multiplex lines 76 and 85 are connected to link interface 78, and time multiplex lines 77 and 86 are connected to link interface 79. It should be noted that the time-slot interchange unit 11 operates on the basis of 512 time slots (channels) per frame while the link interfaces 78 and 79 and the time multiplex switch 10 operate on the basis of 256 time slots (channels) per frame. Further, the channels of data words received from and transmitted to time-slot interchange unit 11 are in complete synchronism. That is, whenever a channel having a given numerical designation is received by link interface 78 from time-slot interchange unit 11, both link interfaces 78 and 79 will be receiving and transmitting channels having the same numerical designation with respect to the time-slot interchange unit 11. In order to maintain synchronism after the split, all odd-numbered channels on time multiplex line 68 are delayed by multiplex/demultiplex circuit 75 so that the odd-numbered channel and the immediately following even-numbered channel are transmitted on a respective one of time multiplex lines 76 and 77 substantially simultaneously. Similarly, each data word from link interface 79 on time multiplex line 86 is delayed by multiplex/demultiplex circuit 75 such that it is transmitted on time multiplex line 70 immediately after the data word received by multiplex/demultiplexor 75 substantially simultaneously therewith. In the course of the following description, the time slot of a given data word refers to its time slot with respect to link interfaces 78 and 79 and the time multiplex switch 10. For example, data words from channels 1 and 2 of time multiplex line 68 are both associated with time slot 1 of the link interfaces 78 and 79 and the time multiplex switch 10. Each of the link interface units 78 and 79 is uniquely associated with one input/output port pair of time multiplex switch 10.

Link Interface 78

Link interface 78 (FIG. 4) includes the receiver 82 which receives data words transmitted serially from time multiplex switch 10 via time multiplex line 15 and serially retransmits this information on a conductor 83. A clock recovery circuit 84 receives the incoming bit stream by connection to conductor 83 and recovers a 32.768 megahertz clock signal therefrom. This clock signal is used to provide timing for the link interface circuit 78. For reasons to be described in greater detail later herein, the information received on time multiplex line 15 is not necessarily in channel synchronization with that transmitted on time multiplex line 13. In order to achieve channel synchronism between the data words on time multiplex lines 76 and 85, the incoming data words on conductor 83 are buffered in a random access memory circuit 87. The data words on conductor 83 are written into random access memory 87, at a location defined by a write address generator 88. Write address generator 88 receives a 2.048 megahertz clock signal from the clock recovery circuit 84 and in response thereto generates a recurring sequence of 256 write addresses in synchronism with the incoming data words on conductor 83. Data words are read from random access memory 87 for transmission to time-slot interchange unit 11 at locations defined by a read address generator 89 which generates a recurring sequence of 256 read addresses. The read addresses are derived from information received from an offset circuit 90. Offset circuit 90 receives the write addresses generated by the write address generator 88, and effectively subtracts a predetermined number therefrom. The result of this subtraction is then transmitted to read address generator 89. In this manner, read address generator 89 generates a sequence of read addresses which is a predetermined number of addresses behind those generated by the write address generator 88. In the present embodiment, the read address generator 89 is approximately one-fourth of a frame (64 time slots) behind the addresses generated by the write address generator 88.

Link interfaces 78 and 79 of interface unit 69 operate in a master slave mode to maintain channel synchronism. In the present embodiment, link interface 78 is the master and continues to operate in the manner described above. The read address generator of link interface 79 is, however, driven by read addresses from the read address generator 89 of link interface 78. It should be noted that, due to possible differences in the length of time multiplex lines 15 and 16, more or less than one-quarter frame of information may separate the write addresses and read addresses utilized in link interface 79. This occurs since the data words transmitted on time multiplex lines 85 and 86 are in channel synchronism while no such synchronism is required on time multiplex lines 15 and 16.

The same channel is used in a given link interface to both transmit and receive control messages. The particular channel used by given link interface, e.g., link interface 78, to convey control messages is preset and stored in a control channel register 81. Each read address generated by read address generator 89 is transmitted to a comparator 91 which compares that read address to the preset control channel designation stored in control channel register 81. When comparator 91 determines that the instant read address is identical to the control channel designation, it generates a gating signal which is transmitted to control message source register 80 and to a control message destination register 92. Control message destination register 92, in response to the gating signal from comparator 91, stores the information on time multiplex line 85. During that particular channel, the information on time multiplex line 85 comprises the contents of the control channel to be utilized by the control unit 17. By the operation of DMA unit 58, the contents of control word register 92 are transmitted to memory 57 before the next control channel. Similarly, control word source register 80 responds to the gating signal from comparator 91 by gating its contents out to time multiplex line 76, thus transmitting the control word. Control words are transmitted and received by link interface 79 in a substantially similar manner, however, the particular control channel designation associated with link interface 79 is different than that associated with link interface 78.

The read addresses generated by read address generator 89 are also transmitted to a frame sequence generator 93. Frame sequence generator 93 responds thereto by generating a unique sequence of framing bits at the rate of one bit per channel. During each channel, the bit generated by the frame sequence generator 93 is transmitted to a frame insert circuit 94 which places the framing bit into the G-bit location of the data word from time-slot interchanger 11. The data word including this framing bit is then transmitted via a parallel serial register 95 and a driver circuit 96 to time muliplex line 13 which is connected to a unique input port of time multiplex switch 10. Each data word received by line interface 78 includes a framing bit which is generated and transmitted by the time multiplex switch 10. A frame checker 97 reads each framing bit of each data word from time multiplex switch 10 and determines if the communication between time multiplex switch 10 and itself is still in synchronism. If synchronism exists, no corrections are made; however, if synchronism is found not to exist, reframing is accomplished by communication with the clock recovery circuit 84 in a manner well known in the art.

Central Control Intervention

A third mode for transmitting control information also exists in the present system. This mode is utilized to transmit commands from central control 30 to the central control intervention arrangement 71 of particular control units to direct the performance of certain functions by the particular control unit. Each control word transmitted from central control 30 includes 16 bit positions of which six comprise the actual control word. The seventh bit position is used for the transmission of commands from central control 30 to the various central control intervention arrangements 71. When each control word is transmitted from control word destination 92 to the DMA circuit 58, the seventh bit position is transmitted to central control intervention arrangement 71. Each intervention command is a 64-bit word which comprises a logical one-start bit, 7 data bits, 4 control bits, and 52 check bits. The central control intervention arrangement 71 accumulates the bits of a command at the rate of one bit per frame until an entire command is received. Central control intervention arrangement 71 performs error checks on the received command and directs the performance of the commanded function based on status information received from its associated processor called the local processor and from the processor of the associated control unit called the mate processor. For example, central control intervention arrangement 71 of control unit 17 implements commands based on status information from processor 66 of control unit 17 (the local processor), and on status information from the processor of control unit 17' (the mate processor).

It will be remembered that interface unit 69 receives one control channel at link interface 79 and another at link interface 78. The central control intervention arrangements 71 of both control units 17 and 17' are connected to receive commands from both link interfaces 78 and 79. When a command is being received from one link interface, no command can be received from the other. Central control intervention arrangement 71 associated with control unit 17 is shown in detail in FIG. 11. The central control intervention arrangement associated with the other control units is substantially identical to that shown in FIG. 11. The seventh bit of each control word received by link interface 78 is transmitted to central control intervention arrangement 71 via conductor 72. Conductor 72 is connected as an input to a switch 201. Switch 201 is also connected to a conductor 73 which is used to convey the seventh bit of each control word received by link interface 79. The output terminal of switch 201 is connected to the data input terminal of an error check circuit 202. When no command is being received by central control intervention arrangement 71, neither conductor 72 or 73 is connected to error check circuit 202. However, when a command is being received, the particular one of conductors 72 or 73 which is conveying the command is connected by switch 201 to error check circuit 202. Switch 201 is controlled by a leading "1" detector 203.

Leading "1" detector 203 includes a pair of AND gates 204 and 205 each of which is connected to a respective one of conductors 72 and 73. Also connected as an input to AND gate 204 is a clock conductor 74 which conveys a clock signal having pulses aligned with the incoming digits on conductor 72. The second input to AND gate 205 is connected to a clock conductor 74' which conveys a clock signal from control unit 17' having pulses aligned with the incoming digits on conductor 73. Conductors 74 and 74' are also connected as inputs to a switch 208. The outputs of AND gates 204 and 205 are connected as inputs to an OR gate 207. Leading "1" detector 203 also includes a dual D type flip-flop 206, the D inputs of which are connected to conductors 72 and 73. As previously stated, each command begins with a logical "1" start bit. Whenever a logical "1" start bit is received at central control intervention arrangement 71, the output of one of the AND gates 204 and 205 will become a logical "1" depending on which conductor 72 or 73 is receiving the logical "1" start bit. The logical "1" from AND gate 204 or 205 will drive the output of OR gate 207 which is connected to the clock input of flip-flop 206 to the logical "1" state. Flip-flop 206 responds to the logical "1" clock input by storing the information on lines 72 and 73. Flip-flop 206 has two output terminals, one of which corresponds to each input line 72 and 73. Accordingly, a logical "1" output will be generated by flip-flop 206 corresponding to the incoming line 72 or 73 which receives the logical "1" start bit. Signals on the output conductors from flip-flop 206 are used to control switch 201 to connect the particular conductor 72 or 73 which received the logical "1" to error check circuit 202. Further, the signals on the output conductors from flip-flop 206 control switch 208 to connect the clock conductor 74 or 74' which is associated with the line 72 or 73 receiving a command to a clock input terminal of error check circuit 202 and to a pulse counter 209. For example, if a logical "1" start code is received on conductor 72, leading "1" detector controls switch 201 to connect conductor 72 to the data input of error check circuit 202 and it controls switch 208 to connect conductor 74 to the clock input terminal of error check circuit 202.

Pulse counter 209 on receipt of the first clock pulse, transmits a logical "1" signal to D flip-flop 206 via conductor 201. D flip-flop 206 responds to the logical "1" on conductor 210 by inhibiting any further change of state. Pulse counter 209 counts the incoming clock pulses to determine when an entire command has been received. When a count of 64 is reached, the logical "1" is removed from conductor 210, thus enabling D flip-flop 206 to change state at the next leading "1". Further, pulse counter 209 transmits a logical "1" to error check circuit 202 to gate the 7-bit data portion and the 4-bit control portion of the received command to a register 211, and the 4-bit control portion to a one-out-of-sixteen decoder 212. If the error check circuit 202 detects an error in the incoming command, an error signal is generated which disables the one-out-of-sixteen decoder 212, and which is communicated to the local processor by means described later herein. One-out-of-sixteen decoder 212 responds to the four control bits from error check circuit 202 by transmitting a logical "1" on a particular output conductor. A logical "1" on a given output conductor of decoder 212 defines that a particular command has been received. Of the 16 possible outputs of decoder 212, 11 are connected directly to register 211, 3 are transmitted to a function decoder 213, and 2 are not used. The particular command selected by each of the possible four control bit combinations is shown in the following Table 1.

TABLE 1

| CONTROL BITS | | | | |
|---|---|---|---|---|
| C3 | C2 | C1 | C0 | FUNCTION |
| 0 | 0 | 0 | 0 | Diagnostic Message 1 |
| 0 | 0 | 0 | 1 | Force Active Side 1 |
| 0 | 0 | 1 | 0 | Force Active Side 0 |
| 0 | 0 | 1 | 1 | Diagnostic Message 4 |
| 0 | 1 | 0 | 0 | Clear CPI Force Active |
| 0 | 1 | 0 | 1 | Diagnostic Message 3 |
| 0 | 1 | 1 | 0 | Diagnostic Message 2 |
| 0 | 1 | 1 | 1 | CPI Force Reset |
| 1 | 0 | 0 | 0 | Unequipped |
| 1 | 0 | 0 | 1 | Diagnostic Message 5 |
| 1 | 0 | 1 | 0 | Diagnostic Message 6 |
| 1 | 0 | 1 | 1 | Unequipped |
| 1 | 1 | 0 | 0 | Diagnostic Message 7 |
| 1 | 1 | 0 | 1 | Sanity Timer Disable |
| 1 | 1 | 1 | 0 | Sanity Timer Enable |
| 1 | 1 | 1 | 1 | Diagnostic Message 8 |

The diagnostic messages 1 through 8 are generally sent from central control 30 in response to a request from control unit 17 to check the operation of central control intervention arrangement 71. Accordingly, local processor 66 periodically reads register 211 after transmitting to central control 30 a request for a particular diagnostic message to determine if the proper diagnostic message is received. The commands "Enable Sanity Timer" and "Disable Sanity Timer" are used to enable and disable, respectively, the sanity timer of the local control unit 17. These particular commands are used to set and reset a single bit position of register 211. However, before local processor 66 can respond to these commands, it must be notified of their existence. Accordingly, the output conductors of decoder 212 representing Enable Sanity Timer and Disable Sanity Timer are connected as inputs to an OR gate 214, the output of which is connected to a non-maskable interrupt terminal of local processor 66. In response to the non-maskable interrupt, local processor 66 reads the contents of register 211 to determine the command received. It should be noted that the error indication from error check circuit 202 is also connected as an input to OR gate 214. Thus, when an error is detected in an incoming command, a non-maskable interrupt will be started by local processor 66.

Three of the remaining four commands must be interpreted in a function decoder 213 on the basis of the present status of the local control unit 17 and the mate control unit 17'. Accordingly, central control intervention arrangement 71 includes a 6-bit status register 215, the outputs of which are connected to function decoder 213. Status register 215 has one-bit position or flip-flop to indicate each of the following:

1. Local control unit identity
2. Local control unit "A" flip-flop
3. Local control unit run flip-flop
4. Mate control unit forced active
5. Mate control unit "A" flip-flop
6. Mate control unit run flip-flop The outputs of status register 215 representing the local control unit run and "A" flip-flops are also connected to the status register of the mate control unit. The local control unit identity bit indicates which control unit a given central control intervention circuit is associated with. The run flip-flop indicates whether the associated control unit is running or not. The "A" flip-flop of a particular control unit when taken in conjunction with the run flip-flop of that control unit, defines which control unit, e.g., 17 or 17', is active. That is, a control unit having a logical "1" "A" flip-flop and a logical "1" run flip-flop is active. Normally, only one control unit, e.g., 17, is active, however, during fault conditions and certain diagnostic actions any combination of "A" flip-flops and run flip-flops is possible. The mate control unit forced active indicates that the mate control unit, e.g., 17', is being forced active and that no operation can be performed to force the local control unit 17 active until a command is received to clear the force active. One bit position of register 211 represents the forced active status of the local control unit. the contents of this bit position are conveyed to the status register of the mate's central control intervention arrangement via a conductor 216. As previously stated, function decoder 213 interprets the incoming commands on the basis of status information from register 215. In some cases, function decoder 213 will generate no output in response to a command, for example, when function decoder 213 receives a command to force a control unit, e.g., 17 active, when the other control unit 17' is already being forced active, no output is generated.

Two force active commands exist in the present system, each defining one of the control units to be forced active. When a force active command is received, the logical "1" from one-out-of-sixteen decoder 212 representing that command is transmitted to function decoder 213 which interprets the command based on information in status register 215. A force active output is generated by function decoder 213 when the local control unit identity is the same as the control unit defined by the command and when the mate control unit is not being forced active. A force active output from function decoder 213 is connected to a unique bit position in register 211 and as an input to OR gate 214. It will be remembered that a logical "1" output from OR gate 214 starts a non-maskable interrupt by the local control unit, which during the interrupt reads register 211 to determine what action should be taken. When the local control unit, e.g., 17, finds the force active signal, it will set its "A" flip-flop and run flip-flop and become the active processor.

The forced reset command is used to reset one or both of the control units, and is interpreted by function decoder 213 of the central control intervention 71 arrangement associated with the control unit having a "0" identity in accordance with the following Table 2.

TABLE 2

| A F/F processor "0" | Run F/F processor "0" | A F/F processor "1" | Run F/F processor "1" | Action at Processor "0" |
|---|---|---|---|---|
| 0 | 0 | 0 | 0 | Reset |
| 0 | 0 | 0 | 1 | Reset |
| 0 | 0 | 1 | 0 | Reset |
| 0 | 0 | 1 | 1 | |
| 0 | 1 | 0 | 0 | Reset |
| 0 | 1 | 0 | 1 | Reset |
| 0 | 1 | 1 | 0 | Reset |
| 0 | 1 | 1 | 1 | |
| 1 | 0 | 0 | 0 | Reset |
| 1 | 0 | 0 | 1 | |
| 1 | 0 | 1 | 0 | Reset |
| 1 | 0 | 1 | 1 | |
| 1 | 1 | 0 | 0 | Reset |
| 1 | 1 | 0 | 1 | Reset |
| 1 | 1 | 1 | 0 | Reset |

TABLE 2-continued

| A F/F processor "0" | Run F/F processor "0" | A F/F processor "1" | Run F/F processor "1" | Action at Processor "0" |
|---|---|---|---|---|
| 1 | 1 | 1 | 1 | Reset |

A similar interpretation table describes the operation of the central control intervention arrangement associated with the control unit having a "1" identity bit. Generally stated, a given function decoder 213 will generate a reset output to the local control unit when neither control unit, e.g., 17 or 17', is running or when the status as shown by the "A" and run flip-flops of the local control unit is equal to or exceeds the other control unit. One exception exists to the above general rule, whenever both control units are in the active state, only an arbitrarily selected one of the control units (the control unit having a logical "0" local identity in the present embodiment) is reset. The reset output of function decoder 213 is connected to a unique bit position of register 211, and as an input to OR gate 214. As previously discussed, the output of OR gate 214 causes a non-maskable interrupt by the local processor which reads register 211 to determine what action should be taken. Reset commands serve to put the local control unit in a state from which it can continue call completion. Several levels of reset are available. A reset can initialize a given process within the local control unit, clear all transient calls in the associated time slot interchange unit, clear all transient and stable calls in the associated time slot interchange unit, or can cause an entire rewrite of the local processor memory. The particular level of reset is defined by the data portion of the command which is stored in register 211. When a reset is detected during a non-maskable interrupt, the control unit or units being reset analyzes the data portion of register 211 to determine the reset level. The last central control intervention command is the clear force active command. Whenever a clear force active command is received by decoder 212, a logical "1" is transmitted on the particular output conductor representing that command to register 211 and to OR gate 14. This logical "1" is used by register 211 to reset the bit position associated with the force active function and via OR gate 214 to start a non-maskable interrupt by the local processor 66. Only one clear force active command is utilized to terminate the force active condition in either control unit 17 or 17'.

Time Multiplexed Switching Unit

Figure 5:
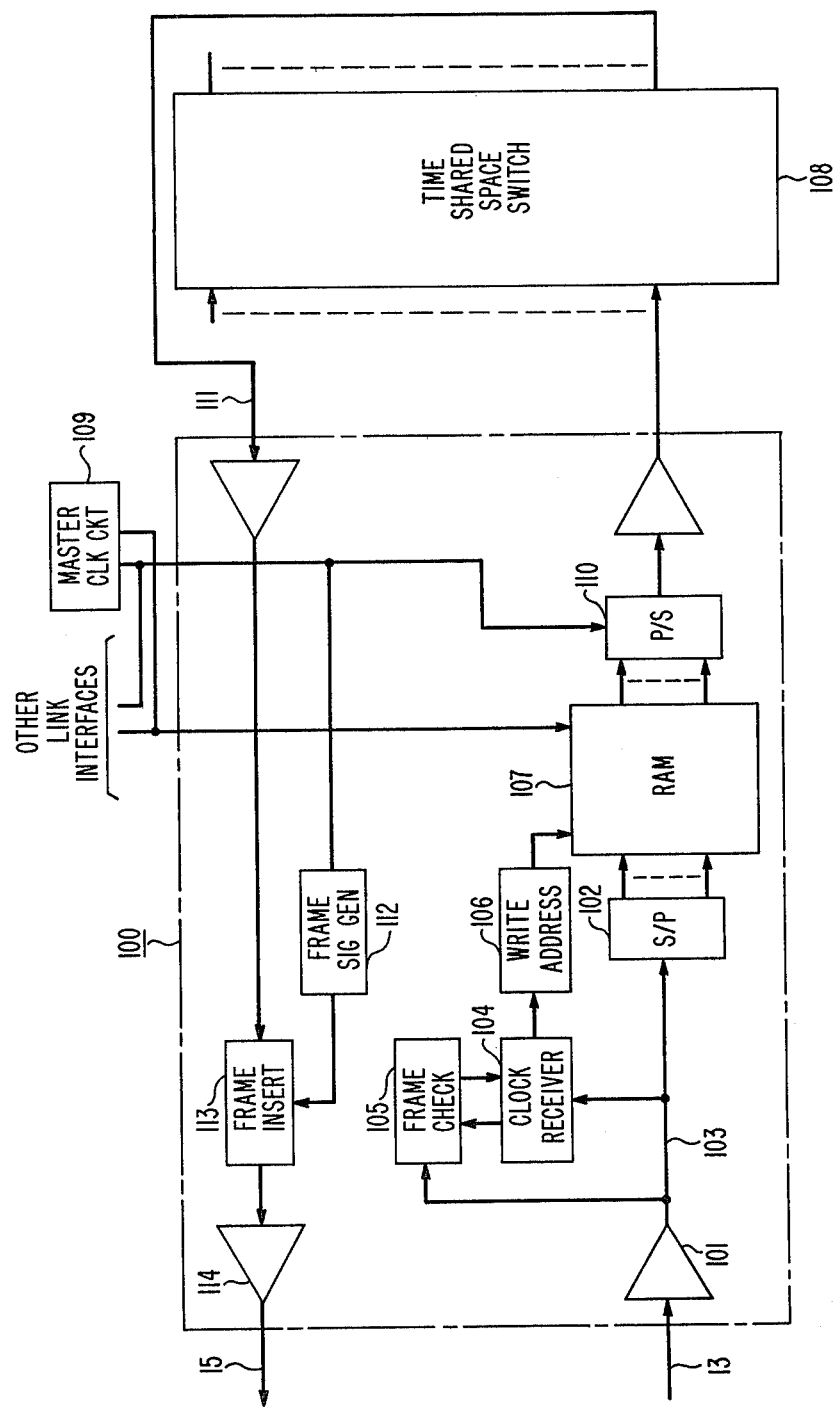
FIG. 5 is a diagram of a link interface unit of a time multiplex switching unit which is utilized for communication with a time-slot interchange unit of the embodiment of FIG. 1.

The input and output ports of time multiplex switch 10 can be considered in pairs for both ports are connected to the same link interface. Further, each pair of input and output ports of the time multiplex switch 10 is connected to a time multiplex switch link interface of a type similar to link interfaces 78 and 79. In the present embodiment, link interface 78 is connected to a time multiplex switch link interface 100 (FIG. 5). Time multiplex switch link interface 100 includes a receiver 101 which receives data words from time mulitplex line 13 and transmits these data words to a serial-parallel register 102 via a time multiplex line 103. The bit stream from time multiplex line 103 is also applied to a clock recovery circuit 104 and a frame check circuit 105 which derive clock signals therefrom and determine if frame synchronism is present, respectively. Time multiplex switch link interface 100 further includes a write address generator 106 which generates a sequence of write addresses in response to signals from clock receiver circuit 104. Each data word transmitted to serial-parallel register 102 is then written into a random access memory 107 at the address generated by write address generator 106.

Time multiplex switch 10 also includes the time-shared space division switch 108 which operates in frames of 256 time slots of approximately 488 nanoseconds each to complete paths among its input and output ports. Control information defining the switching path between the input and output ports to be connected during each time slot is stored in a control memory 29 (FIG. 1) which is read each time slot to establish those connections. It will be remembered that each time slot has a numerical designation and that during a given time slot the data word channel having the same numerical designation is to be switched. Accordingly, all data words in a channel having a given numerical designation must be transmitted to the time-shared space division switch 108 during their associated time slot to avoid inaccurate switching. To this end, time multiplex switch 10 includes a master clock circuit 109 for generating a recurring sequence of 256 read addresses which are transmitted to each random access memory of each time multiplex switch link interface substantially simultaneously. Accordingly, random access memory 107 and the equivalent random access memories included in all other time multiplex switch link interfaces read a data word associated with the same time slot at substantially the same time. In the present embodiment, the data words read from random access memory 107 are transmitted to a parallel-serial shift register 110 from which they are transmitted to time-shared space division switch 108.

All data words to be transmitted on time multiplex line 15 to link interface 78 are received from the time-shared space division switch 108 on a conductor 111 within one time slot of their transmission into time-shared space division switch 108. Time multiplex switch link interface 100 includes a frame sequence generator 112 which generates a sequence of framing bits at the rate of one bit per time slot. The framing bits are transmitted to a frame insert circuit 113 which places the frame bit in bit position G of each data word on conductor 111. Each data word on conductor 111 is then transmitted via driver circuit 114 to link interface 78 via time multiplex line 15.

Control Distribution Unit

Figure 4:
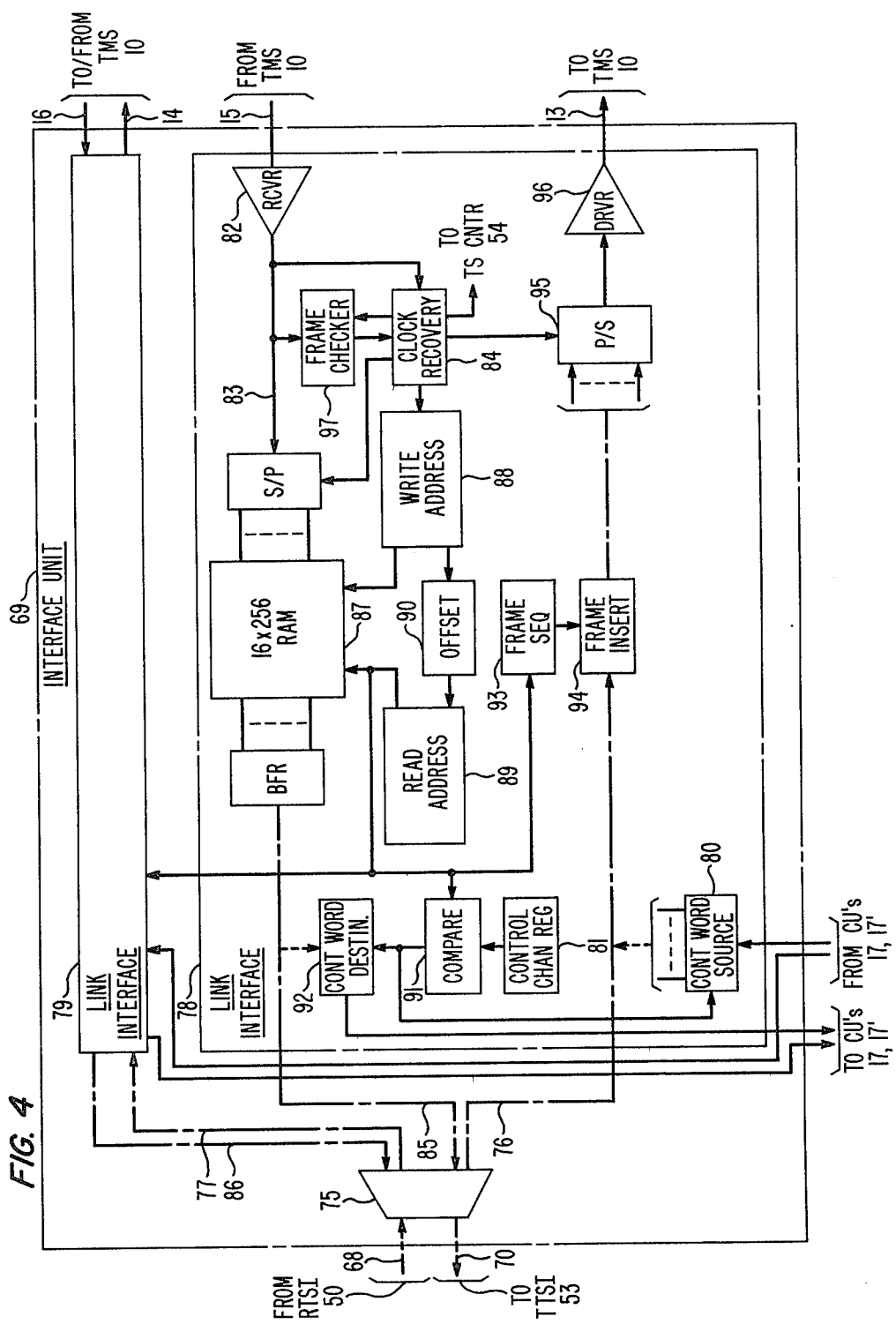
FIG. 4 is a diagram of a link interface unit included within each time-slot interchange unit which is utilized for communication with the time multiplex switching unit of the embodiment of FIG. 1.

Each control time slot is transmitted by time multiplex switch 10 (FIG. 1) to the control distribution unit 31 via time multiplex lines 150 and 151 which are connected to input/output port pair 64. In the course of the following description, control time slots from a given control unit are referred to as transmit control time slots while control time slots to a given control unit are referred to as receive control time slots. Control distribution unit 31 which is shown in greater detail in FIG. 7 includes a link interface circuit 152 which is substantially identical to link interface circuit 78 (FIG. 4). The link interface circuit 152 does not contain the control word source register 80, the control channel register 81, the compare circuit 91 or the control word source designation register 92 (FIG. 4), since the functions performed by these circuits are not required in the control distribution unit 31. Each control word received on time multiplex line 150 is transmitted in parallel from the link interface circuit 152 to a control distribution unit input circuit 153 in the transmit control time slot associated with that control word. The time slot designation of each control word transmitted to the control distribution unit input circuit 153 is substantially simultaneously transmitted via a communication path 154 to a timing circuit 155. The time-slot designations so transmitted are generated by a read address generator (not shown) of link interface 152 which is the equivalent of read address generator 89 of link interface 78 (FIG. 4). Control distribution unit input circuit 153 is essentially a demultiplexor having one input port and 256 output ports. Each control word received at the input port of control distribution unit input circuit 153 is transmitted to the unique one of 256 output ports defined by the time-slot designation transmitted on communication path 154.

The present embodiment includes thirty-one time-slot interchange units, e.g., 11 and 12, each having access to two transmit and two receive control time slots. Accordingly, the information transmitted to link interface circuit 152 on time multiplex line 150 will include at most 62 transmit control time slots. Similarly, time multiplex line 151 will convey, at most, 62 control time slots back to time multiplex switch 10. Control distribution unit input circuit 153 thus requires only 62 active output ports. In the present embodiment these active output ports are associated with the first 62 time slots of a frame and are referred to by the designations TS 1 through TS 62. The output port of control distribution unit input circuit 153 associated with time slot TS 1 is connected to a buffer register 158 and the output port associated with time slot TS 62 is connected to a buffer register 159. The control circuitry 185 associated with transmit control time slot TS 1 is substantially identical to the control circuitry for the remaining 61 transmit control time slots. Accordingly, only the control circuitry 185 associated with time slot TS 1 is described in detail herein. Buffer register 158 is connected to the data input terminal of a first-in/first-out buffer 160 which buffer responds to a logical "1" pulse at its write control terminal W to write into its first storage cell the contents of buffer register 158. In accordance with well-known principles of first-in/first-out buffers, any information placed in the first storage cell "ripples" to the last unoccupied storage cell where it is held until the information is read from the first-in/first-out buffer. First-in/first-out buffer 160 further includes a read control terminal R. In response to a logical "1" pulse at this read control terminal R, the contents of the last memory cell are transmitted from the first-in/first-out buffer and the contents of all other cells of the buffer are shifted one cell toward the output.

It will be remembered that each control message from the time-slot interchange unit, e.g., 11, begins with a start character and ends with an end character. The contents of buffer register 158 are continuously transmitted to a start comparator 162 and an end comparator 163. Start comparator 162 includes a comparison circuit and a register which stores the start character. When the contents of buffer register 158 matches the stored start character, start comparator 162 transmits a logical "1" to the set input of a flip-flop 164. Whenever flip-flop 164 is in the set state, it generates a logical "1" on its logical "1" output terminal which is transmitted to an AND gate 165. The output terminal of AND gate 165 is connected to the write control terminal W of first-in/first-out buffer 160. The other input of AND gate 165 is connected to a terminal $t_2$ of timing circuit 155. Timing circuit 155 transmits from terminal $t_2$ a series of pulses occurring at the rate of one pulse per frame during a time $t_2$ which occurs during time slot TS 2. Timing circuit 155 includes a one out of n decoder which receives the time-slot designations transmitted on communication path 154 and applies a logical "1" pulse to the unique one of its 256 output terminals corresponding to the incoming time-slot designation. The particular one of these terminals which receives the logical "1" pulse during time slot TS 2 is transmitted as signal $t_2$ to the input of AND gate 165.

After the reception of a start character in buffer register 158, a new control word will be placed in buffer register 158 during time slot TS 1 of each frame. Further, each pulse $t_2$ transmitted to control terminal W of first-in/first-out buffer 160 causes the contents of buffer register 158 to be stored in the first storage cell of first-in/first-out buffer 160. This action continues until the end character is stored in buffer register 158.

End comparator 163 includes a comparator circuit and a register storing the end character. End comparator 163 generates a logical "1" output pulse when the character stored in buffer register 158 is found to match the end character stored in end comparator 163. This logical "1" output pulse is transmitted via a delay unit 166 to the reset input of flip-flop 164. Delay unit 166 delays logical "1" pulse for a period of time greater than one time slot. When the logical "1" is received by flip-flop 164, that flip-flop resets causing a logical "0" to be applied to its logical "1" output terminal which inhibits AND gate 165 from transmitting any further $t_2$ timing pulses to the control terminal W of first-in/first-out buffer 160.

End comparator 163 upon the detection of the end character in register 158 also transmits a flag signal to a CDU controller 168 over a bus 167. This flag signal defines that a completed control message has been received by first-in/first-out buffer 160. CDU control 168, in response to each flag signal from control circuit, e.g., 185, reads the entire control message from the first-in/first-out buffer storing that control message. In the present embodiment, CDU control 168 initiates such a reading operation by transmitting a 6-bit code defining which first-in/first-out buffer contains the control message to be read to a one out of 64 decoder 169. One out of 64 decoder 169 responds to the 6-bit code from the control distribution unit control 168 by applying a logical "1" to an AND gate associated with the read control circuitry of the first-in/first-out buffer storing a control message. In the present example, first-in/first-out buffer 160 is storing a control message. Accordingly, the 6-bit code transmitted to one out of 64 decoder 169 defines AND gate 170 which is associated with first-in/first-out buffer 160. In response to this 6-bit code, one out of 64 decoder 169 transmits a logical "1" to AND gate 170. Additionally, control distribution unit controller 168 transmits a series of pulses at a 2-megahertz rate to the other input of AND gate 170. It should be noted that the series of 2-megahertz pulses is also transmitted simultaneously to equivalent AND gates in the other control circuits. Since AND gate 170 is receiving a logical "1" from decoder 169, the 2-megahertz pulses are transmitted by AND gate 170 to the read control terminal R of first-in/first-out buffer 160. In response to each of these pulses a control word is read from first-in/first-out buffer 160 and transmitted to the CDU controller 168 via a bus 176. When the CPU controller 168 detects an end character in the information it receives from bus 176, it terminates the transmission of the 2-megahertz pulses. CDU controller 168 includes a memory circuit which is utilized to store each control word read from one of the receive first-in/first-out buffers, e.g., 160 and 161. When a complete control message is received and stored, the CDU controller 168 reads the destination portion of that control message to determine if the control message is to be transmitted to the central control 30 or to one of the control units, e.g., 17 and 18. When the destination portion of the control message defines the central control 30, control distribution unit control 168 reads the control message from its internal storage and transmits that control message to central control 30 via communication path 32. Alternatively, when the destination portion defines a control unit the control distribution control 168 computes the particular receive control time slot associated with that defined control unit. The particular receive control time slot is determined from a translation table stored within the control distribution unit controller 168.

Control distribution unit 31 in the present embodiment includes a second plurality of first-in/first-out buffers of which first-in/first-out buffers 171 and 172 are shown in FIG. 7. First-in/first-out buffers 171 and 172 are associated with a respective one of output registers 173 and 174. Each first-in/first-out buffer and its associated output register are utilized to transmit control words to the time multiplex switch 10 in the receive control time slot associated with the destination defined by each control message. In the present example, it will be assumed that the control message transferred from first-in/first-out buffer 160 to control distribution unit 168 is destined for a module which utilizes time slot 62 (TS 62) as a receive control time slot. Control distribution unit controller transmits to one out of 64 decoder 169 a 6-bit code uniquely defining the control circuitry 186 associated with first-in/first-out buffer 171. The logical "1" generated by one out of 64 decoder 169 is applied to an AND gate 175 the output terminal of which is connected to the write control terminal W of first-in/first-out buffer 171. Additionally, CDU controller 168 begins to reach each control word of the control message and apply it to bus 176 which is connected in common to all of the first-in/first-out buffers, e.g., 171 and 172. Substantially, simultaneously with the transmission of each control word to the first-in/first-out buffers, control distribution unit control 168 transmits a logical "1" pulse to AND gate 175 and the equivalent AND gates in each of the other control circuits. Since only AND gate 175 receives a logical "1" from one out of 64 decoder 169, only it passes the logical "1" pulses from control distribution unit controller 168 to terminal W of its associated first-in/first-out buffer 171. In response to each logical "1" pulse received at its write control terminal W, first-in/first-out buffer 171 writes the control word on bus 176 into its input storage cell. As previously described, these control words "ripple" to the output storage position of the buffer.

CDU controller 168 also transmits a start signal to the set input terminal of flip-flop 177 at the beginning of a control message transmission function. The logical "1" output of flip-flop 177 is applied to an AND gate 178, the output terminal of which is connected to the read control terminal R of first in/first out buffer 171. Additionally, AND gate 178 receives as an input the signal $t_{61}$ so that after flip-flip 177 is set, a logical "1" pulse is delivered to the terminal R of first in/first out buffer 171 in response to each signal $t_{61}$. Accordingly, during each $t_{61}$ time slot after flip-flop 177 is set, the control word in the last storage position of first-in/first-out buffer 171 is transmitted to the output register 173. Output register 173 includes a gating control terminal which is connected to the output signals $t_{62}$ from timing circuit 55. In response to each signal, $t_{62}$ output register 173 transmits the information at its input terminals to a CDU output circuit 179 during the time slot TS 62.

Each control word read from first-in/first-out buffer 171 is also applied to the inputs of an end compare circuit 180 which is substantially identical to the end compare circuit 163. When end compare circuit 180 detects that the character being transmitted from first-in/first-out buffer 171 to output register 173 is the end character, it generates a logical "1" pulse which is transmitted via a delay circuit 181 to the reset terminal of flip-flop 177. Delay circuit 181 delays the logical "1" pulse from end compare circuit 180 for a period of time greater than one time slot. In this manner, flip-flop 177 is reset to inhibit the transmission of further $t_{61}$ signals to first in/first out buffer 171 after the transmission of the end character.

CDU output circuit 179 is a multiplexor having 256 input ports and one output port. The first 62 of the input ports are each uniquely associated with one of the time-slot output registers, e.g., 173 and 174. In response to time-slot count signals from timing circuit 155 control distribution unit output circuit 179 transmits a control word from one of the output registers, e.g., 173 and 174, to its output port. The output port is in turn connected to link interface circuit 152 which operates as previously described to transmit the control words received thereby to time multiplex switching unit 10.

Central control 30 also generates control messages to be transmitted to the control units, e.g., 17 and 18. Each control message generated by central control 30 includes a destination portion defining the particular control unit which is to receive the control message. Control messages are transmitted from the central control 30 to the control distribution unit control 168 via communication path 32. Control distribution unit control 168 stores each control message received from central control 30 and as previously described, reads each stored destination portion to determine the control unit for which the control message is intended. Control distribution unit control 168 transmits control messages from central control 30 in the same manner that it transmits control messages received from the first-in/first-out buffers 160 and 161.

Call Setup Example

The following is an example of call setup and removal in the present embodiment. In the example, a subscriber at subscriber set 23 wishes to call subscriber 26. Line unit 19 detects the originating off-hook at subscriber set 23 and transmits a message to control unit 17 via communication path 27. Control unit 17, in response to this message from line unit 19 transmits an instruction to line unit 19 defining which communication channel between line unit 19 and time-slot interchange unit 11 is to be used for data word communication. Further, control unit 17 begins to transmit dial tone in the channel associated with the newly off-hook subscriber between time-slot interchange unit 11 and line unit 19. Control unit 17 continues to survey the DC state of subscriber set 23. Control unit 17 further detects the dialing of digits at subscriber set 23 and terminates dial tone in response to the first such digit. Based on the entire dialed number and the calling party's identity, control unit 17 formulates a control message for central control 30. This control message comprises a destination portion identifying central control 30 and further includes the calling party identity, the called party identity, and certain calling party related information, e.g., class service.

Figure 8:
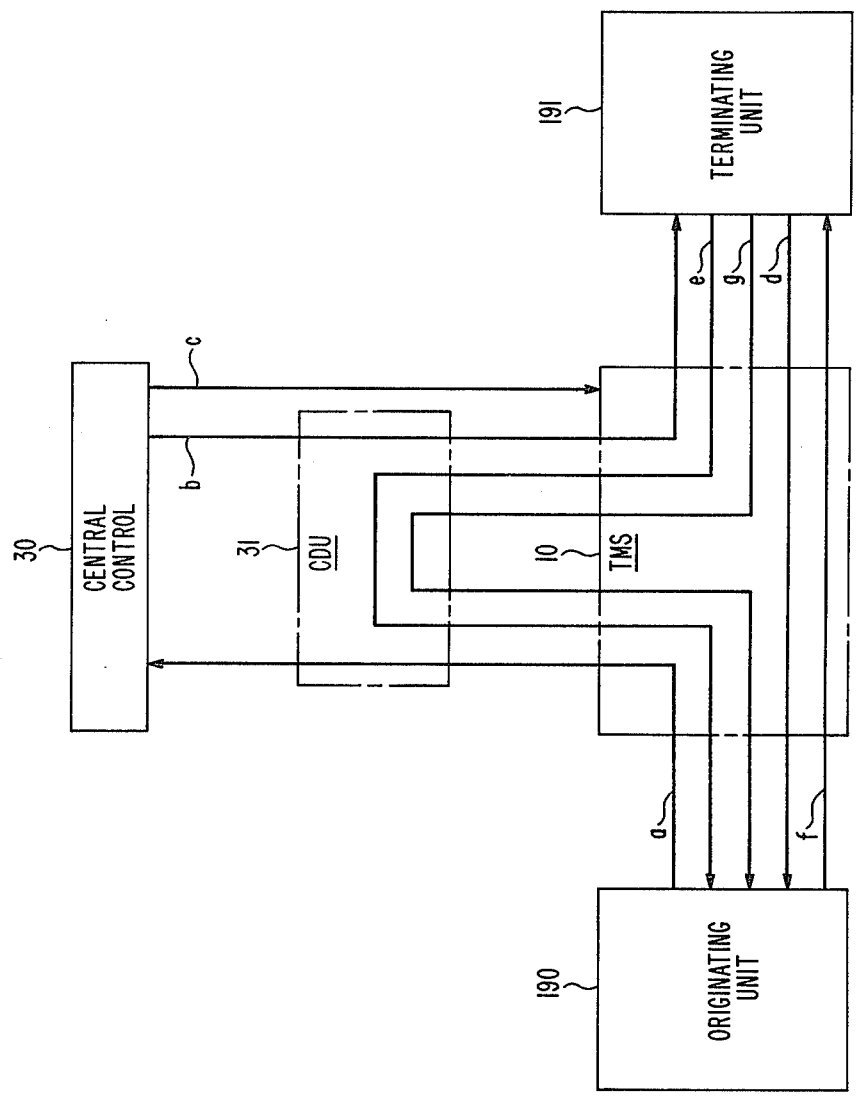
FIG. 8 is a functional diagram of the call completion control messages exchanged by the distributed processors of the embodiment shown in FIG. 1.

FIG. 8 is a functional diagram of the communication among the processors for the establishment of a call between subscribers. In FIG. 8 originating unit 190 represents originating subscriber set 23, line unit 19, time-slot interchange unit 11, and control unit 17. Similarly, terminating unit 191 represents terminating subscriber 26, line unit 22, time-slot interchange unit 12, and control unit 18. Each communication in the call completion sequence is represented in FIG. 8 by a line, terminating with an arrowhead to indicate its direction, having an associated letter (a) through (g). In the course of the following discussion, the letters (a) through (g) are used to identify the particular communication being discussed. The control message (a) formulated by control unit 17 of the originating unit 190 is transmitted, as previously described, one control word per frame in the control channel of time multiplex line 13. In the present embodiment, the time multiplex line associated with an odd-numbered input/output port is the primary time multiplex line used to convey control messages. The time multiplex line associated with an even-numbered input/output port pair is utilized to convey longer messages such as program and/or data update messages. Accordingly, the control channel of time multiplex line 13 is used to convey the control messages in the present example. The control words in this control channel are switched by time multiplex switch 10 to the control distribution unit 31 during the time slot associated with that control channel. As previously described, control distribution unit 31 interprets the destination portion of the message received and transmits the message to central control 30.

Central control 30 computes the identity of the time-slot interchange unit associated with the called party identity and assigns an idle time slot for communication between called and calling parties. In the present example, it is assumed that time slot 16 is selected for this communication. Central control 30 then transmits a control message (b) to time-slot interchange unit 12 of terminating unit 191 which is connected to subscriber set 26 via the control distribution unit 31 and time multiplex switch unit 10. This control message (b) comprises the called subscriber identity, the identity of time-slot interchange unit 11 which is connected to the calling party and the time slot to be used for communication through time multiplex switch unit 10. At substantially the same time that central control 30 transmits the control message (b) to time-slot interchange unit 12, it transmits instructions (c) to control memory 29 via communication path 49 which instructions define the switching paths to be used during time slot 16 to connect time-slot interchange unit 11 and time-slot interchange unit 12. Control unit 18 of terminating unit 191 in response to the control message (b) from central control 30 assigns a channel between line unit 22 and time-slot interchange unit 12 for the communication with subscriber set 26 and begins transmission of the logical "1" E-bit (d) in the channel associated with subscriber set 26 to the time multiplex switching unit 10. It will be remembered that a control unit controls the transmission of logical "1" E-bits in a given channel by accessing the storage location of RAM 55 associated with that channel and setting its E-bit position to a logical "1". Further, control unit 18 formulates a control message defining the identities of time-slot interchange unit 12 of the terminating unit 191, the time slot (time slot 16) which is to be used for the communication, and any information about subscriber 26 which is necessary for control unit 17 to complete the call. This control message (e) is transmitted to time-slot interchange unit 11 of originating unit 190 via the control channel to time multiplex switch unit 10, the control distribution unit 31 and back through time multiplex switch unit 10 in the control channel associated with time-slot interchange unit 11. In addition to the above, processor 66 of control unit 18 instructs E-bit check circuit 192 to survey the state of the E-bit in time slot 16 for a predetermined period of time, e.g., 128 frames.

Control unit 17, in response to the message from control unit 18 begins to transmit in the channel associated with subscriber set 23 a logical "1" E-bit (f) to time multiplex switch unit 10. Further, control unit 17 of the originating unit 190 checks the E-bit of the incoming channel 16 from time-slot interchange unit 12 for the presence of a logical "1". When such a logical "1" E-bit is received, a continuity signal is transmitted from E-bit check circuit 192 to processor 66 of control unit 17 indicating that communication path continuity from time-slot interchange unit 12 to time-slot interchange unit 11 is known. When communication path continuity exists from time-slot interchange unit 11 to time-slot interchange unit 12, E-bit check circuit 192 of control unit 18 will detect a logical "1" E-bit in channel 16 during the predetermined period of time. E-bit check circuit 192 of control unit 18 transmits a continuity signal to its associated processor 66 in response to the logical "1" E-bit. In response to the continuity signal from E-bit check circuit 192 of control unit 18, line unit 22 is notified to transmit ring current to subscriber set 26 and audible ring tones are returned during time slot 16 to subscriber set 23. When subscriber set 26 is taken off-hook, line unit 22 notifies control unit 18 which removes audible ring from transmission to subscriber set 23 and the ring current applied to subscriber set 26. Control unit 18 then transmits a control message (g) over the control channel from time-slot interchange unit 12 to time-slot interchange unit 11 indicating that an answer has occurred. The parties can now communicate.

Call termination normally is controlled by the control unit associated with the calling party, which, in the present example, is control unit 17. When subscriber 23 goes on-hook, the E-bit in the channel between subscriber sets 23 and 26 is changed to a logical "0". Control unit 18 in response to the logical "0" E-bit transmits a control message to central control 30 defining that its part of the call is completed. Further, a similar message is transmitted from control unit 17 when the on-hook is detected. In response to these two messages, central control 30 controls the control memory 29 to drop the path connecting the channels between subscriber sets 23 and 26. Further, the control units 17 and 18 make the path from their associated subscriber sets to the time multiplex switch unit 10 idle so that these paths can be used for further communications. When subscriber set 26 is the first to go on-hook, control unit 18 transmits the control message to control unit 17 via the control channel informing control unit 17 that the on-hook has occurred. Control unit 17, in response to such a message, waits for a predetermined period of time, similar to hit timing, then initiates the call termination procedure as described immediately above.

The terminating party can have certain characteristics which change the normal call completion/termination routine. For example, subscriber 26 (the terminating subscriber of the previous example) might be subject to call tracing. In this situation it is desirable that any call to subscriber 26 be held in the completed state until subscriber 26 goes on-hook. In accordance with this example, a call is established in much the same manner as described in the previous example. The first control message from time-slot interchange unit 12 to time-slot interchange unit 11, however, will include a portion indicating that call tracing is operative on the soon-to-be-completed call. Control unit 17 in response to this control message, modifies the call termination sequence so that the completed paths are not removed until a message is received from control unit 18 indicating that subscriber 26 has gone on-hook.

In the preceding embodiment, commands are transmitted from central control 30 to a given central control intervention arrangement 71 by placing at central control 30 one bit of the command in each of 64 control words of a control message. If a large number of control messages causes congestion within the control distribution unit 31, it may be desirable to reduce the control distribution unit involvement in the transmission of central control intervention commands. An alternate embodiment partially shown in FIG. 12 could be used to reduce such involvement. The alternate embodiment comprises a plurality of 64-bit shift registers each associated with one of the output registers, e.g., 173 and 174 of control distribution unit 31 (FIG. 7). FIG. 12 shows the alternate implementation for use with the output register 173 associated with the control channel utilizing time-slot 62. When central control 30 desires to transmit a command to a given control unit, it computes the control time-slot of that control unit, and transmits the command directly to a 64-bit register 220 associated with that time-slot. Register 220 has a serial output which is connected to output register 173 to replace the seventh bit position in that output register. It will remembered that the gating pulse $t_{61}$ is used to gate control words (or nothing if no control word is present) from first-in/first-out buffer 171 to output register 173. In the alternative embodiment, the same gating pulse $t_{61}$ is used to gate one bit of the command in register 220 to the seventh bit position of output register 173 for transmission to the control unit associated with time-slot 62. Accordingly, the alternate embodiment assures that a command will occupy the seventh bit position of 64 consecutive control channels whether or not an actual control message is being transmitted from central control 30.

It is to be understood that the above-described embodiment is merely illustrative of the principles of the invention and that other arrangements may be devised by those skilled in the art without departing from the spirit and scope of the invention.

What is claimed is:
1. A time-division switching system comprising
   a plurality of communication units each comprising a communication unit controller and an intervention controller;

a control arrangement for transmitting control messages each control message comprising a plurality of control words;

a time-shared space division switch connected to said communication units and said control arrangement for selectively transmitting said control words to said communication units; and wherein each of said communication units further comprises means for receiving said control words transmitted thereto, means for transmitting a first portion of each received control word to said communication unit controller and for transmitting a second portion of each received control word to said intervention controller and; wherein said intervention controller comprises means responsive to said second portions of said control words for altering the functions performed by said communication unit controller.

2. A time-division switching system comprising a plurality of communication units each comprising a communication unit controller and an intervention controller;

a control arrangement for transmitting control messages each control message comprising a plurality of control words and for transmitting intervention commands;

a time-shared space division switch connected to said communication units and said control arrangement for selectively establishing a recurring sequence of time separated control channels between said control arrangement and selected ones of said communication units;

means for transmitting said control words in first portions of said control channels and for transmitting said intervention commands in second portions of said control channels; and wherein each of said communication units further comprises means for receiving the information transmitted in said control channels, means for transmitting said first portion of each control channel to said communication unit controller and for transmitting a second portion of each control channel to said intervention controller; and said intervention controller comprises means responsive to said second portions of said control channels for altering the functions performed by said communication unit controller.

3. A time-division switching system in accordance with claims 1 or 2 wherein a plurality of said second portions comprise an intervention command and wherein said intervention controller comprises means for accumulating said second portions until an entire intervention command is received.

4. A time-division switching system in accordance with claim 3 wherein each intervention command comprises a control portion and a data portion said intervention controller comprises interpretation means responsive to said control portions for generating control signals defining the particular intervention command received, and interrupt signal generating means responsive to said control signals for generating interrupt signals; and said communication unit controller comprises means responsive to said interrupt signals for reading said data portion and said control portion of the last received intervention command.

5. A time-division switching system in accordance with claim 4 wherein each intervention command further comprises an error check portion;

said intervention controller comprises error check means responsive to said error check portions, said data portions, and said control portions for generating error signals when an error is present in a received intervention command; and said intervention controller comprises means responsive to said error signals for inhibiting the operation of said interpretation means.

6. A time-division switching system in accordance with claim 5 wherein said interrupt signal generating means comprises means responsive to said error signals for generating said interrupt signals and said communication unit controller comprises means responsive to said interrupt signals for reading said error signals.

7. A time-division switching system in accordance with claim 4 wherein each of said communication unit controllers comprises status indicating means for generating status signals defining the stage of the communication unit controller comprising the status indicating means; and said interpretation means comprises means responsive to said control portions and said status signals for generating said control signals.

8. A time-division switching system comprising a plurality of communication units each comprising a first and a second communication unit controller and a first and second intervention controller, one of said intervention controllers being uniquely associated with each of said communication unit controllers;

a control arrangement for transmitting control messages each control message comprising a plurality of control words;

a time-shared space division switch connected to said communication units and said control arrangement for selectively transmitting said control words to said communication units; and wherein each of said communication units further comprises means for receiving said control words transmitted thereto, means for transmitting a first portion of each received control word to said communication unit controllers and for transmitting a second portion of each received control word to said intervention controllers; and each of said intervention controllers comprises means responsive to said second portions of said control words for altering the functions performed by said communication unit controller uniquely associated therewith.

9. A time-division switching system comprising a plurality of communication units each comprising a first and a second communication unit controller and a first and second intervention controller, one of said intervention controllers being uniquely associated with each of said communication unit controllers;

a control arrangement for transmitting control messages each control message comprising a plurality of control words and for transmitting intervention commands;

a time-shared space division switch connected to said communication units and said control arrangement for selectively establishing a recurring sequence of time separated control channels between said control arrangement and said communication units;

means for transmitting said control words in first portion of said control channels and for transmitting said intervention commands in second portions of said control channels; and wherein each of said communication units further comprises means for receiving the information transmitted in said control channels, means for transmitting said first portion of each control channel to said communication unit controllers and for transmitting said second portion of each control channel to said intervention controllers; and each of said intervention controllers comprises means responsive to said second portions of said control channels for altering the functions performed by the communication unit controller associated therewith.

10. A time-division switching system in accordance with claims 8 or 9 wherein a plurality of said second portions comprise an intervention command and wherein said intervention controllers comprise means for accumulating said second portions until an entire intervention command is received.

11. A time-division switching system in accordance with claim 10 wherein each intervention command comprises a control portion and a data portion said intervention controllers comprise interpretation means responsive to said control portions for generating control signals defining the particular intervention command received, and interrupt signal generating means responsive to said control signals for generating interrupt signals and said communication unit controllers comprise means responsive to said interrupt signals generated by the one of said intervention controllers uniquely associated therewith for reading said data portion and said control portion of the last intervention command received by the intervention controller uniquely associated therewith.

12. A time-division switching system in accordance with claim 11 wherein each intervention command comprises an error check portion;

each of said intervention controllers comprises error check means responsive to said error check portions, said data portions, and said control portions for generating error signals when an error is present in a received intervention command and means responsive to said error signals for inhibiting the operation of said interpretation means.

13. A time-shared space division switch in accordance with claim 12 wherein said interrupt signal generating means comprises means responsive to said error signals for generating said interrupt signals and each of said communication unit controllers comprises means responsive to said interrupt signals for reading said error signals generated by the intervention controller uniquely associated therewith.

14. A time-division switching system in accordance with claim 11 wherein each of said communication unit controllers comprise status indicating means for generating status signals defining the state of the communication unit controller comprising the status indicating means; and said interpretation means comprises means responsive to said control portions and status signals from said first and said second communication unit controllers for generating said control signals.

* * * * *

UNITED STATES PATENT AND TRADEMARK OFFICE
CERTIFICATE OF CORRECTION

PATENT NO. : 4,484,323

DATED : November 20, 1984

INVENTOR(S) : Hugo J. Beuscher, Harry L. Bosco, Allen H. Huizinga, John R. Williams It is certified that error appears in the above-identified patent and that said Letters Patent is hereby corrected as shown below:

In the claims, Column 30, claim 7, line 26, delete "stage" and substitute therefor --state--.

Signed and Sealed this

Seventh Day of January 1986

[SEAL]

Attest:

DONALD J. QUIGG

Attesting Officer

Commissioner of Patents and Trademarks